Sept. 20, 1960                B. H. CISCEL                2,953,329
             AUTOMATIC CONTROL APPARATUS FOR AIRCRAFT
Filed Aug. 30, 1956                              11 Sheets-Sheet 1
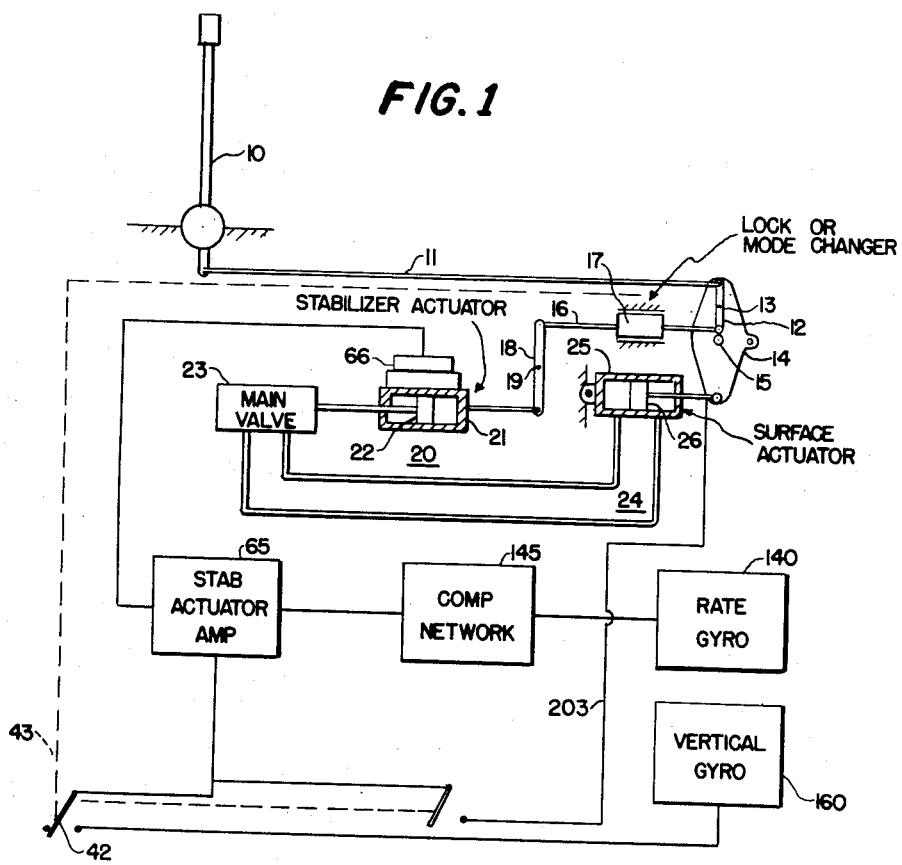
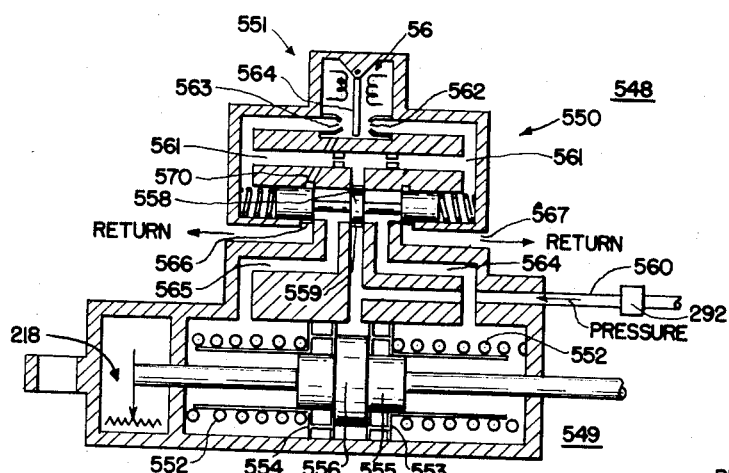
INVENTOR.
BENJAMIN H. CISCEL
BY
Gordon Reed
ATTORNEY

INVENTOR.
BENJAMIN H. CISCEL

BY Gordon Reed
ATTORNEY

Sept. 20, 1960

B. H. CISCEL 2,953,329

AUTOMATIC CONTROL APPARATUS FOR AIRCRAFT

Filed Aug. 30, 1956

INVENTOR.
BENJAMIN H. CISCEL

BY Gordon Reed

ATTORNEY

Sept. 20, 1960     B. H. CISCEL     2,953,329
AUTOMATIC CONTROL APPARATUS FOR AIRCRAFT
Filed Aug. 30, 1956     11 Sheets-Sheet 11

INVENTOR.
BENJAMIN H. CISCEL
BY
*Gordon Reed*
ATTORNEY

United States Patent Office 2,953,329
Patented Sept. 20, 1960

2,953,329

AUTOMATIC CONTROL APPARATUS FOR AIRCRAFT

Benjamin H. Ciscel, Medford Lakes, N.J., assignor to Minneapolis-Honeywell Regulator Company, Minneapolis, Minn., a corporation of Delaware Filed Aug. 30, 1956, Ser. No. 607,073

34 Claims. (Cl. 244—77)

This invention relates to automatic control apparatus for controlling a condition, and with more particularity this apparatus pertains to automatic pilots for controlling a dirigible craft.

In many modern fighter type of aircraft, the stability of the aircraft is somewhat sacrificed in order to obtain higher maneuverability thereof so that it may be said that high performance is obtained at the expense of inherent aerodynamic damping.

One object of this invention is to improve the dynamic stability of a high performance aircraft by operating surfaces thereof to reduce or damp the angular oscillations of the craft about an axis caused by transient disturbances.

A further object of this invention is to provide improved operable damping means for the craft oscillations about both the pitch and yaw axes to improve the dynamic stability of the craft about its lateral axis and about its turn or vertical axis.

A further object of this invention is to provide a novel pitch and yaw damper to improve the dynamic stability of an aircraft which damper functions in response to pitch rate and yaw rate signals.

A further object of this invention is to provide a novel yaw damper to improve the dynamic stability of the aircraft about its turn axis and which yaw damper additionally functions to maintain coordinated flight of the craft in banked attitude.

A further object of this invention is to provide an improved yaw damper for increasing the dynamic stability of the craft about its turn axis and also for coordinating the flight of the aircraft during turn entry, during recovery from, and also during the steady state portion of a banked turn of the craft.

A further object of this invention is to provide a pilot assist apparatus cooperable with the pitch and yaw damper to maintain the aircraft in a fixed flight attitude in roll, pitch, and in heading.

A further object of this invention is to synchronize the pilot assist apparatus to the existing attitude of the aircraft while it is being controlled by the pitch and yaw damper, preparatory to attitude control from the pilot assist apparatus.

A further object of this invention is to prevent changes in the roll attitude of the craft while the pilot assist apparatus is ineffective due to malfunction in the operation of the pitch damper.

A further object of this invention is to provide a monitoring arrangement for disengaging the damper system from control of the craft upon malfunction in a control circuit for such damper system to return the craft to solely manual control.

A further object of this invention is to provide in the damper system a monitoring arrangement responsive to the operation of two other monitoring subsystems.

A further object of the invention is to provide a monitoring arrangement in the pilot assist apparatus to prevent imposing automatic attitude control from the pilot assist apparatus if the pilot assist apparatus does not synchronize to existing craft attitude.

A further object of the invention is to provide monitoring arrangements for both the pitch and yaw damper system and pilot assist apparatus to insure proper operation of the pitch and yaw damper and pilot assist apparatus, or to disengage either pitch and yaw damper and pilot assist apparatus from control of the craft upon a malfunction occurring therein.

The above and further objects of this invention will become more fully appreciated upon review of the following specification taken in conjunction with the accompanying drawings disclosing a preferred embodiment of the invention.

In the drawings:

Figure 1 is a schematic representation for controlling one aircraft control surface actuator of the craft;

Figures 3–10 together represent an electrical schematic diagram of the combined pitch and yaw damper plus pilot assist apparatus.

Figure 12:
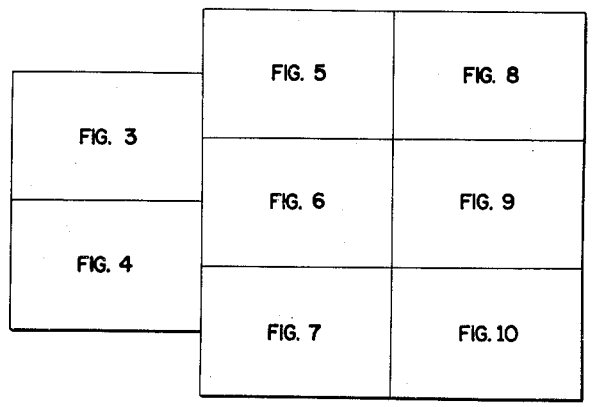

Figure 11 indicates one type of hydraulic servomotor in the pitch and yaw damper system; and Figure 12 illustrates the arrangement of Figures 3–10 to form the system circuit schematic.

Aircraft control is automatically achieved by the apparatus by means of various aircraft condition error-detecting and feedback devices which develop D.C. condition error and D.C. feedback signals. These signals are arranged in an electrical parallel summing network. A resultant signal in such network through a motor or damper actuator operates a control valve for an aircraft servomotor. The deflection of a surface by its servomotor corrects the condition error signal. The polarity of a D.C. signal depends upon the direction of the condition error. The arrangement of Figures 3–10 has three modes of operation: direct manual, manual and pilot assist.

On direct manual mode, the entire arrangement that may automatically control the craft is disengaged, and the human pilot of the craft must use the rudder pedals as well as the control stick to maintain the aircraft in straight and level or in coordinated flight.

On the manual mode, the rudder surface of the craft is controlled automatically from the yaw damper and the pitch attitude control surface of the craft is controlled automatically from the pitch damper. The yaw and pitch damper will serve to increase the dynamic stability of the aircraft which may lack sufficient aerodynamic stability. The human pilot of the aircraft can maintain the aircraft in coordinated flight without using the rudder pedals since the rudder surface is automatically positioned when the pilot of the craft causes the craft to bank or angularly move about its longitudinal axis.

On the pilot assist mode during which the pilot assist apparatus is combined with the pitch and yaw damper, the stabilizer actuator authority is increased, the combined system will maintain the aircraft in a fixed flight attitude in roll, pitch and yaw while yet permitting selected changes in such attitudes.

The pitch and yaw damper and pilot assist apparatus of the present invention has been applied to a delta wing type aircraft. In such aircraft, primary attitude control surfaces consist of a conventional rudder surface along with elevon surfaces which latter combine the function of both conventional elevators and ailerons. The elevon control system is arranged in such manner that longitudinal aircraft stick movement produces identical displacement of both elevons in the same direction whereas lateral stick movement produces differential displacement, that is one elevon moves up and the other moves down.

Each surface is positioned by an aircraft hydraulic servomotor. A servomotor is thus used for each elevon surface and also one is used for the rudder surface. These three servomotors when on manual mode are irreversible, that is, none of the air loads on the control surfaces are reflected at the control stick or the manual rudder pedals.

In Figure 1 the inter-relationship between the aircraft pilot stick, the pitch damper system, the pilot assist apparatus, and the surface servometer is illustrated. In Figure 1, a conventional pilot stick 10 through an operable link 11 positions a two armed lever 12 pivoted at 13 on a further two-armed lever 14. Lever 14 is pivoted approximately at its center and the pivot 15 thereof is radially displaced from pivot 13. The motion of arm 12 about pivot 13 is transmitted through a link 16 to a further two-armed lever 18. Associated with the link 16 is a mode changer 17 more fully to be described. Lever 18 is pivoted at 19 and its movement is transmitted to a stabilizer actuator 20. The motion of arm 18 is a mechanical motion. With the cylinder 21 and ram 22 of stabilizer actuator 20 relatively fixed, actuator 20 may be considered a rigid link, therefore, such motion of the actuator 20 is communicated to a main control valve 23 of the surface servomotor 24. The surface actuator 24 comprises a cylinder 25 fixed to the craft and a movable ram 26 connected to two-armed lever 14 to provide a mechanical feedback. This feed back on Manual repositions valve 23 and on Pilot Assist may adjust stick 10.

The stabilizer actuator 20, as will be hereinafter described in connection with Figure 11, may be automatically controlled when on Manual or Pilot Assist by having its control valve displaced by a valve torquer. The torquer is energized from an amplifier 65 which receives control signals through a compensation network 145 from a rate gyroscope 140. The rate gyroscope, in Figure 1, is responsive to the pitch rate of the craft about its lateral axis. The surface actuator 24 operates one elevon surface of the aircraft so that there is a similar surface actuator for the other elevon surface. Such surface actuator is operated in parallel with actuator 24 so that it also includes a stabilizing actuator similar to actuator 20 in the present instance and is also similarly connected to the pilot stick 10.

Included in the arrangement of Figure 1, in simplified form, is a vertical gyroscope 160 which senses both roll and pitch attitude. Response of vertical gyroscope 160 is transmitted through a selector 42 to the stabilizing actuator amplifier 65. When the selector 42 connects the vertical gyroscope 160 to the servo amplifier 65, it also operates through a camming action of an existing control means 43 connected to the mode changer 17 to secure or lock the link 16 in a centered position.

In the direct manual mode, the stabilizing actuator 20 is not automatically operated and movement of the control stick 10, with the mode changer 17 released, is communicated directly to the main valve 23 to control the surface actuator 24. Mechanical feedback is supplied through the ram 26 and arm 14 to reposition the valve 23. During such feedback, motion is transmitted from the arm 14 through pivot 13 to the arm 12 connected to link 16.

When on manual mode, both the pilot stick 10 and the stabilizer actuator 20 may control the main valve 23. Operation of the stabilizer amplifier 65 from rate gyroscope 140 positions the control valve of the stabilizing actuator 20 causing the ram 22 to move relative to cylinder 21 to position main valve 23 of the surface actuator. The mode changer 17 is released or unlocked at this time to permit mechanical feedback from the surface actuator 24 to reposition the main valve 23 to its unoperated position.

When the selector 42 is operated, the pilot assist apparatus, as represented in simplified form by gyroscope 160, Figure 1, is combined with the control from the rate gyro 140 to operate stabilizer amplifier 65. During this configuration, the mode changer 43 centers and locks the link 16 against displacement. Consequently no mechanical feedback is supplied through the surface actuator 24 to the main valve 23. However, in order to return the main valve 23 to unoperated position, the surface actuator 24 is provided with an electrical feedback signal generator 203 connected to amplifier 65, in a manner to be more fully described hereinafter.

A similar arrangement, with rudder pedals substituted for aircraft stick 10, is provided for the rudder surface of the aircraft, but in such arrangement its stabilizer actuator amplifier is controlled from a yaw rate gyroscope rather than from a pitch rate gyroscope as in Figure 1. Other control devices are also utilized to operate the rudder stabilizer actuator servo amplifier.

It should be noted that the stabilizer actuator, or what may be considered the damper servomotor in each instance, is connected between the surface actuator control valve 23 and the manual operator such as control stick 10. This is a differential arrangement when the mode changer 17 is unlocked in that operation of the surface actuator 24 is not reflected at the stick 10, and the operation of the stabilizing actuator 20 consequently occurs automatically without the human pilot being aware thereof. This lack of feedback, to the stick 10 when on Manual is due to the relatively high friction forces in the forward end of the system.

Figure 2:
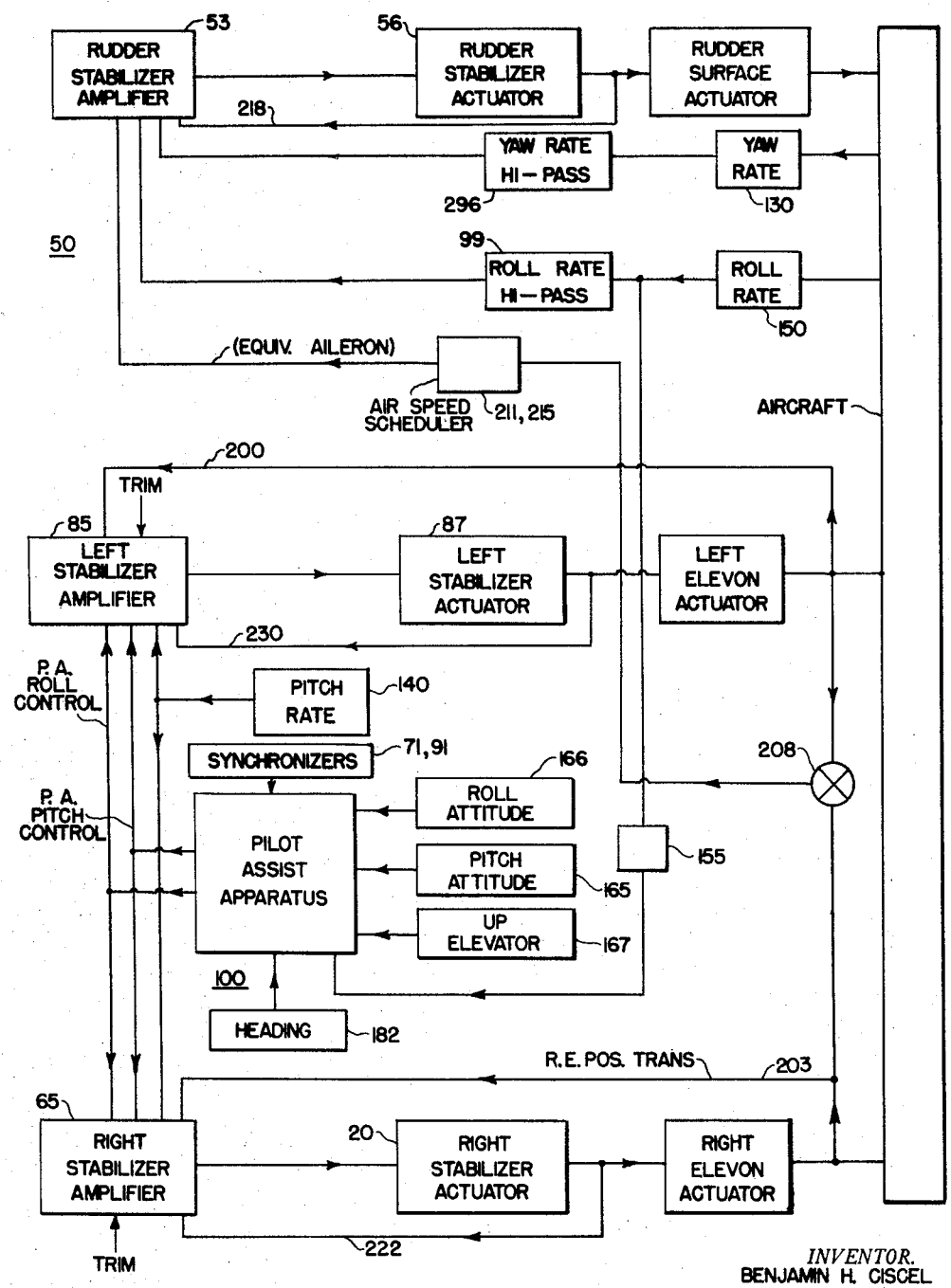
Figure 2 represents a three channel automatic control system disclosed in block diagram.

Having considered a single channel, reference is now made to the complete block diagram of the dynamic elements of the combined pitch and yaw damper plus pilot assist system as shown in Figure 2. In Figure 2, the automatic rudder control system 50 is shown at the top of the figure with control signals supplied from a yaw rate gyroscope 130. The signals are transmitted through a high-passed device 296 to the rudder stabilizer amplifier 53 that in turn controls the rudder stabilizer actuator 56. The rudder stabilizer actuator 56 in turn controls the rudder surface actuator of the craft. The automatic rudder control system additionally includes a control signal from a roll rate gyroscope 150 which signal is supplied through a roll rate high-pass device 99 to the rudder stabilizer amplifier 53. The yaw rate signal is primarily for aircraft yaw damping whereas the high-pass roll rate signal assists turn coordination under both manual and automatic flight, identified as Manual and Pilot Assist modes. An equivalent aileron control signal from device 208 is supplied to the rudder stabilizer amplifier 53 and is in accordance with the differential displacement of the left and right elevon actuators to aid in turn coordination. A rudder stabilizer actuator feedback control signal is also supplied by means 218 to the rudder stabilizer amplifier. An additional electrical input may be provided by a further voltage to the rudder stabilizer amplifier from the surface actuator if the rudder system has its mode changer locked, but, in the present arrangement the mode changer of the rudder system will not be locked in any mode.

The automatic pitch rate control system is shown below the rudder system wherein the output of pitch rate gyroscope 140 is supplied to the left and right stabilizer amplifiers 85, 65 which in turn control their respective stabilizer actuators 86, 20 to position the control valve of the left elevon surface actuator and the right elevon surface actuator to control the craft attitude about the pitch axis. Additional pitch attitude control is supplied from the pilot assist apparatus 100 which receives a pitch attitude signal from a pitch attitude sensor 165, a roll attitude signal from roll attitude sensor 166, and an up elevator signal from a roll attitude sensor 167.

Lateral or bank attitude control signals are fed into both right and left elevon stabilizer amplifiers 65, 85 which result in a differential or opposite motion of the right and left elevon surfaces. The signals for providing roll stabilization are supplied to both stabilizer amplifiers from the pilot assist apparatus 100. The pilot assist apparatus or section receives roll stabilization signals from a roll attitude device 166 and a roll damping signal from the roll rate gyroscope 150. The left and right stabilizer amplifiers 85, 65 also receive separate trim signals from their respective trim or synchronizers devices 71 and 91 as well as stabilizer feedback signals from means 230, 232 from the left stabilizer actuator 87 and the right stabilizer actuator 20.

As with the rudder stabilizer amplifier 53, so too with the left and right elevon stabilizer amplifiers 85, 65 further voltages are applied thereto for the purpose to be described.

Figure 6:
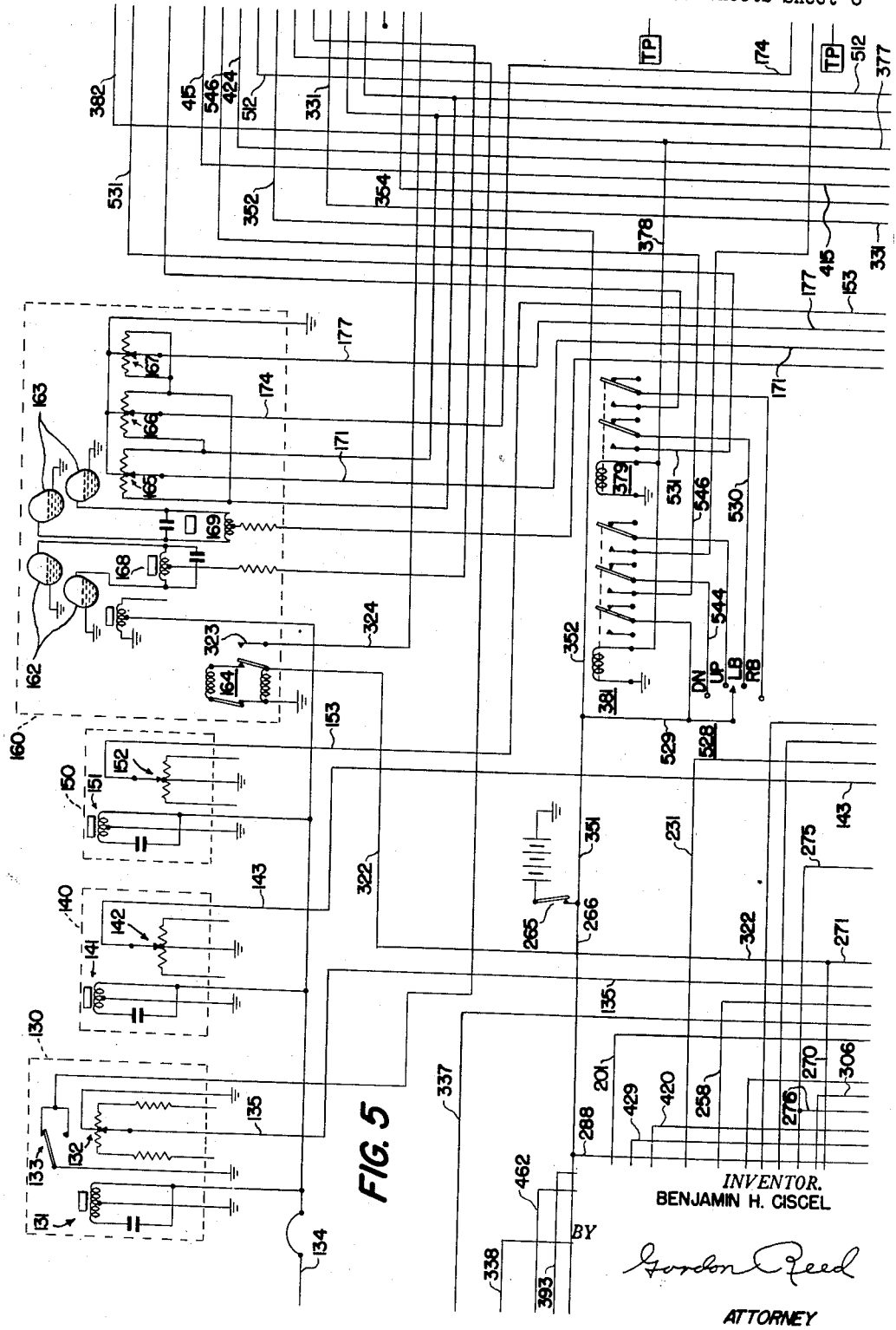

When on the pilot assist mode, the mechanical feedback loop comprising elements 26, 14, 12, 16, and 18, Figure 1, to the stabilizer actuator 20 from the aircraft surface actuator 24 is open or interrupted by the mode changer 17, 43 and electrical feedbacks represented in Figure 6 by means 200, 203 from the control surfaces to the attitude stabilization system in each instance are used. Since there is no way of knowing beforehand the steady state position of the system, means are provided by the trim devices 71 and 91 for balancing out the surface signal so that there is no bump at the time of mode change.

Summarizing, the apparatus shown in Figure 2 controls the aircraft by means of hydraulic surface actuators or servomotors which operate in response to error signals developed in signal bridges.

As will be discussed hereinafter, for convenience, the signal system can be broken down into rudder, right elevon, left elevon, and two pilot assist signal bridges as follows: a rudder signal bridge controls a rudder stabilizer actuator 56 and thus a rudder surface actuator; a right elevon signal bridge controls the right elevon actuator; a left elevon signal bridge controls the left elevon surface actuator; a pilot assist roll signal bridge supplies a composite roll signal to both the right and left elevon signal bridges for supplying pilot assist aileron operation; and the pilot assist pitch signal bridge supplies a composite pitch signal to the right and left elevon signal bridges for pilot assist elevator operation. This will be clarified in Figures 3–10.

Continuing to an electrical schematic arrangement of the entire combined pitch and yaw damper and pilot assist system shown in Figures 3–10, the following general comments relate to a cursory review of such system. A D.C. control signal system is used. Surface operating servomotors and control valve actuators for the servomotors as well as error detecting devices such as gyroscopes, surface position transmitters, and heading sensing means develop signals each of a polarity and magnitude proportional to direction and amount of error respectively. For example, the yaw rate gyroscope 130 develops signals of a certain magnitude dependent on the degrees per second yaw rate with the signal of one polarity for right yaw rate and the opposite polarity for left yaw rate. Error signals are developed using D.C. energized potentiometers with grounded center taps, for example, and when no error exists, the potentiometer sliders rest on the center taps of the potentiometer resistors. Signals may be fed through gain adjusting potentiometers and in some cases through special compensating networks. Both the damper systems and pilot assist apparatus utilize D.C. amplifiers, and all signals are fed to the amplifiers through parallel summing resistors so that a parallel summing network is connected to each amplifier.

We may state that each control surface such as the rudder or an elevon, is operated by a sub system; and each such subsystem includes a two-stage servo amplifier controlled by various error detecting devices with the amplifier in turn controlling a stabilizer actuator that operates a control valve of the surface actuator. In addition, the right and left elevon subsystems each contain an additional summing amplifier and a synchronizer corresponding with the trim devices 71, 91 of Figure 2.

Figure 7:
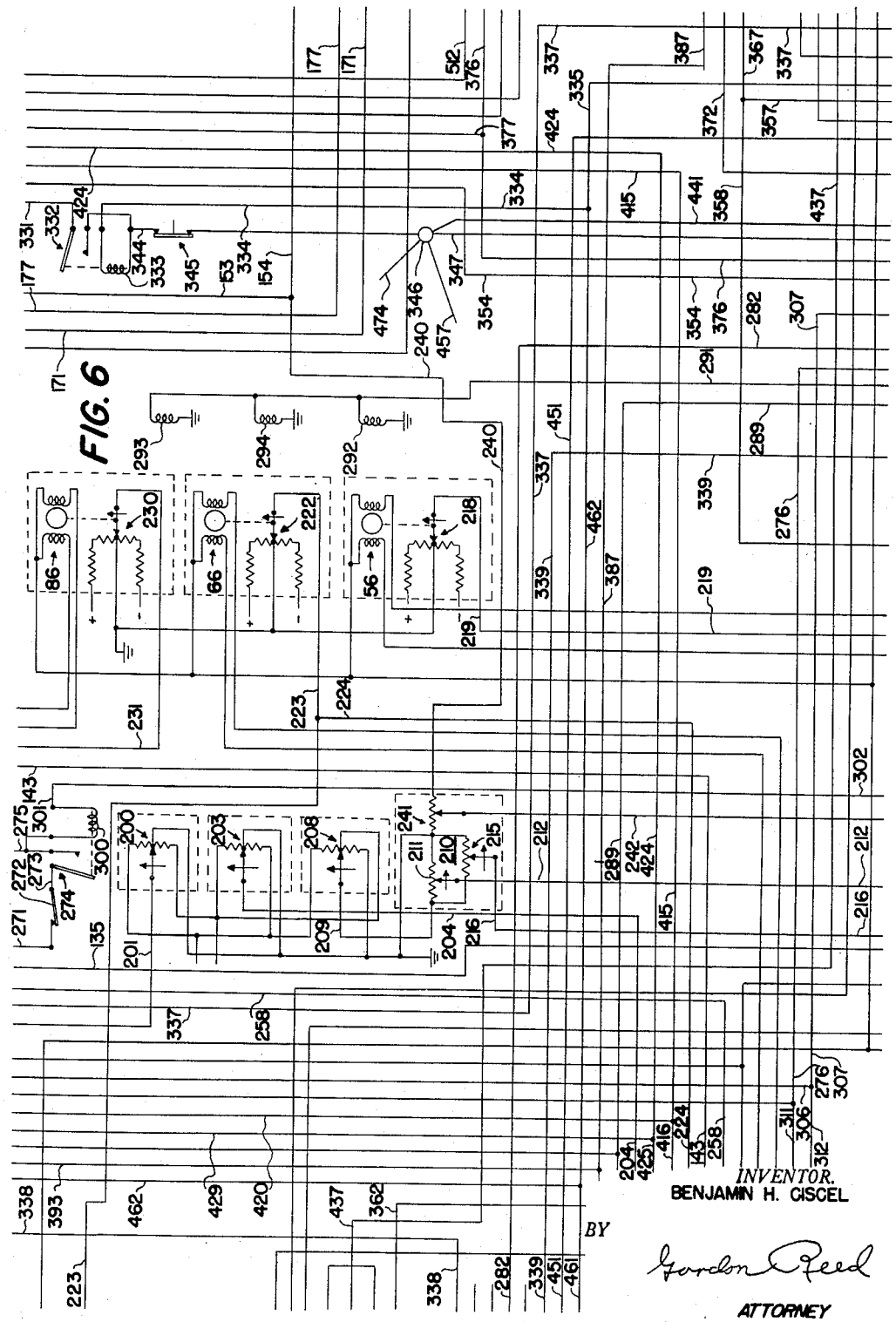

A more detailed discussion of the arrangement shown in Figures 3–10 follows. In Figure 7 there is shown a rudder section 50 that includes the rudder subsystem 51 mentioned. The subsystem 51 includes a balanceable network 52 for supplying control signals and a servo or stabilizer amplifier 53 comprising a summing section 54 and an output section 55. The servo amplifier 53 employs two twin triode tubes which comprise the summing stage 54 and the output stage 55. When in the no signal condition, plate currents in each tube are equal. Control signals impressed on either grid of the summing tube 54 have an effect on both plate currents due to a common cathode connection as shown in the tube. The plates of the output tube 55 are connected to torque motor windings of a torque motor 56, Figure 6, in the rudder stabilizer actuator. The torque motor 56 specifically controls the position of a valve in the rudder stabilizer actuator causing upon application of hydraulic pressure a relative displacement of the cylinder 21, ram 22, Figure 1, for example. The rudder stabilizer actuator in turn operates a control valve of the rudder surface actuator and also drives a potentiometer that supplies a feedback signal 218 into the rudder control network 52. Both the rudder surface servo ram and the rudder stabilizer actuator extend or retract depending upon the polarity of the control signal on tube 54. The control signals supplied to the rudder subsection 51 include yaw rate from gyro 130, equivalent aileron position, roll rate from gyro 150, and stabilizer actuator position feedback control signals.

Figure 4:
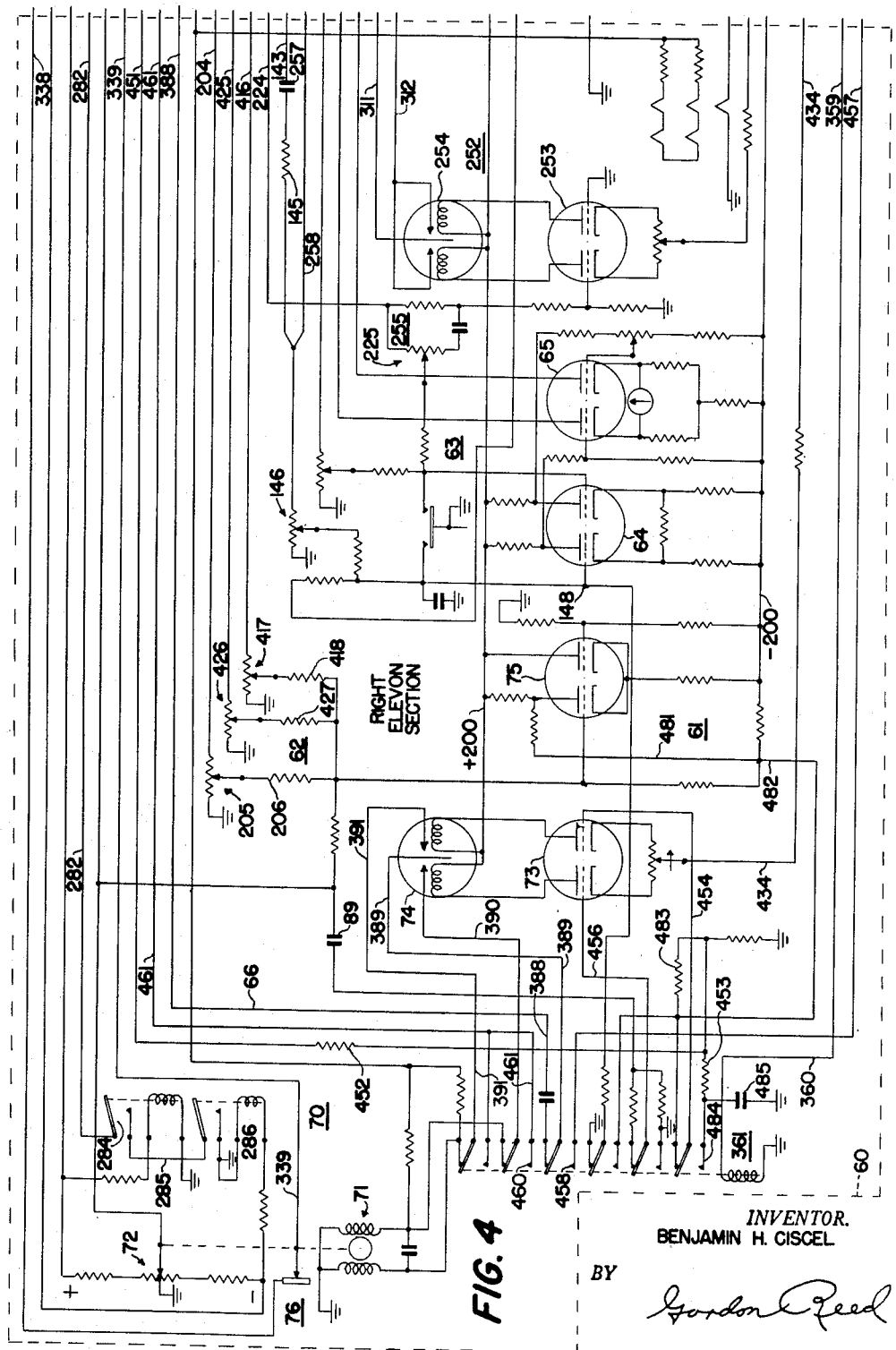

Figure 4 shows a right elevon control section 60 including a right elevon subsection 61 comprising an amplifier control network 62 and a servo or stabilizer actuator amplifier 63 comprising a summing amplifier tube 64 and an output tube 65. The output of tube 65 controls or energizes the windings of a torque motor 66, Figure 6. The torque motor 66 constitutes part of the stabilizer actuator such as actuator 20, Figure 1. The stabilizer actuator 20 either extends or contracts to position a control valve of the elevon actuator 24. The operation of the stabilizer actuator also provides a feedback signal from potentiometer 222 into the control network 62. The summing amplifier 64 and output stage 65 correspond respectively with summing stage 54 and output stage 55 of the rudder subsection 51.

The right elevon section 60, Figure 4, additionally includes a servo mechanism 70 for balancing or synchronizing a surface position feedback signal of the pilot assist while the pilot assist apparatus is not engaged. The servo mechanism 70 comprises a synchronizer motor 71, a synchronizer motor driven potentiometer 72, a conventional micro positioner relay 74, a control tube 73, and the summing amplifier tube 75. When used in connection with the pilot assist apparatus, the term "synchronizing" provided by the servo mechanism 70 refers to the method by which the pilot assist apparatus is coordinated with the aircraft attitude and control system. The synchronizing arrangement permits smooth engagement of the pilot assist apparatus within a wide range of aircraft attitude and elevon trim conditions and, as will be described, prevents engagement of the pilot assist if aircraft attitude exceeds a specified limit. The synchronizing arrangement enables the pilot assist to maintain the aircraft and elevon trim existing at the time of engagement, and provides a means to trim flight attitude after engagement.

The synchronizer motor 71 is a small two-phase or capacitor type induction motor which drives the synchronizer potentiometer slider and actuates limit switches 76. The motor 71 operates from an A.C. single phase voltage source with the capacitor providing the necessary phase shift.

The energization of motor 71 is controlled by the micro positioner relay 74 having a movable contact or armature arranged as a single-pole double-throw switch. The relay conventionally includes a pair of relay windings connected in the two plate circuits of the control tube 73 and when current in the two windings is equal the relay armature is centered between its two coacting fixed contacts. When currents in the two windings are unequal, the armature moves to engage one fixed contact or the other depending upon which winding carries the most current, and a circuit is closed which energizes the synchronizing motor 71.

The control tube 73 is a twin triode, one grid, the right, thereof is connected to the output of summing amplifier 75 whereas the other grid of the control tube is connected to the synchronizer potentiometer 72 through a rate circuit capacitor 89. When both grids are at the same potential, tube currents are equal. Whenever a summing amplifier output exists, tube currents change increasing current through one relay winding and decreasing current through the other.

The summing amplifier 75 uses a single twin triode tube. Input signals may be applied at either grid, and amplifier output is reflected across a voltage divider between the left plate and a −200 volt D.C. supply. Assume that a positive signal is applied at the left grid, left tube plate current will increase, increasing the voltage drop across the tube plate and cathode resistors. This will decrease the left plate voltage, causing a negative voltage at the output. This output voltage is fed back to the input through the feedback voltage divider resistor and a stable condition is reached where the difference between input and output is just sufficient to maintain the output.

Figure 3:
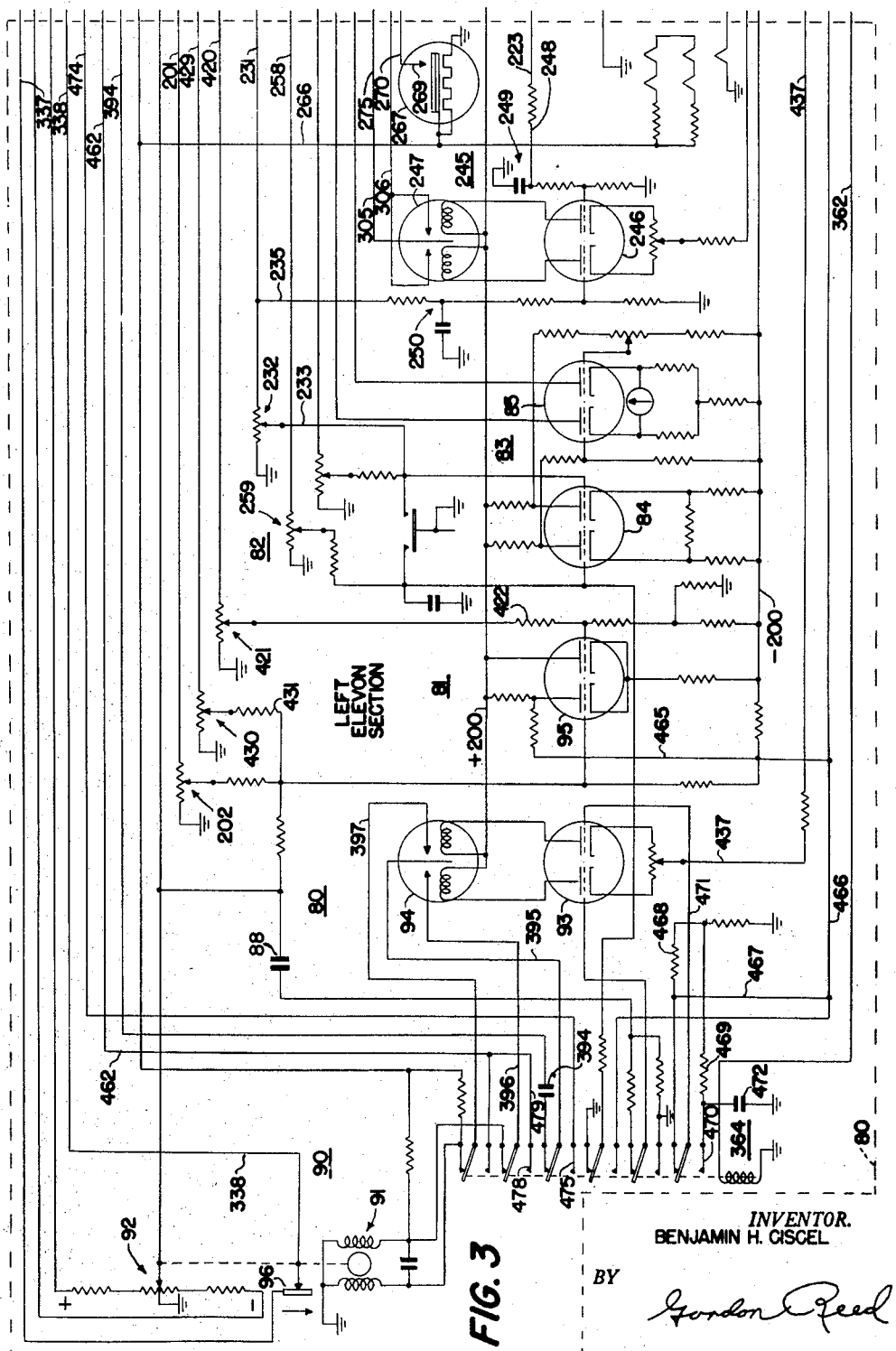

A left elevon section 80, Figure 3, similar to the right elevon section 60 includes a subsystem 81 comprising a control network 82 and a servo amplifier 83 comprising a summing section 84 and an output section 85, each comprising a double triode electronic tube. Control signals from network 82 are applied to the control grids of summing amplifier 84 having its output connected to the control grids of amplifier section 85. The output of output section 85 energizes the windings of a torque motor 86, Figure 6, that positions a control valve of the left elevon stabilizer actuator 87. Displacement of such control valve causes the actuator ram and cylinder to expand or contract and the relative motion thereof operates potentiometer 230 which supplies an actuator feedback signal to network 82.

Also like the right elevon section 60, the left elevon section 80 includes a servo mechanism 90 comprising a synchronizer motor 91, a potentiometer 92 operated thereby, a conventional micro positioner relay 94 controlling energization of motor 91, a control tube 93 energizing said micro positioner relay 94 and a summing amplifier 95 which with the potentiometer 92 supplies control signals to control tube 93. The servo mechanism 90 balances out the surface feedback signal from potentiometer 200, Figure 6, during the period when pilot assist apparatus is not controlling the craft. The summing amplifier 95 is similar to the summing amplifier 75 in right elevon section 60. Thus a surface feedback signal from potentiometer 200, Figure 6, may be applied to the left grid of tube 95 and the change in current caused thereby provides an amplifier output which is developed across a voltage divider between the left plate and the −200 volt D.C. supply. Thus, if the surface feedback signal is positive, the tube left plate current will increase, increasing the voltage drop across the plate and cathode resistors. This will decrease the left plate voltage causing a negative voltage at the output. This output voltage is fed back to the input or grid through the feedback resistor and this output is also fed to the right grid of the control tube 93. This output effects a difference in currents in the plates of the control tube 93 causing operation of the micro positioner 94. The micro positioner 94 energizes the synchronizing motor 91 which operates the potentiometer 92, and the potentiometer 92 supplies the signal to the left grid of the control tube 93 to equalize the currents through the two windings of the micro positioner 94.

It will be noted that the signal from synchronizer potentiometer 72, Figure 4, for example, in the right elevon section 60 is applied through a high pass network 89 to the left control grid of the control tube 73 so that this control signal on the tube is proportional to the rate of change of displacement or velocity of the synchronizing motor 71. Additionally this signal from potentiometer 72 is applied to the left control grid of summing tube 75 to balance the surface feedback signal on conductor 206 also applied to the same grid, consequently the signal derived from the output of tube 75 through the feedback resistor and applied to control tube 73 has no steady state value, and synchronization is attained. Similarly in the manner in which signal on the left grid of the control tube 73 from potentiometer 72 has no steady state value to obtain synchronization, a similar high pass arrangement 88 is provided in the left elevon section 80.

Figure 8:
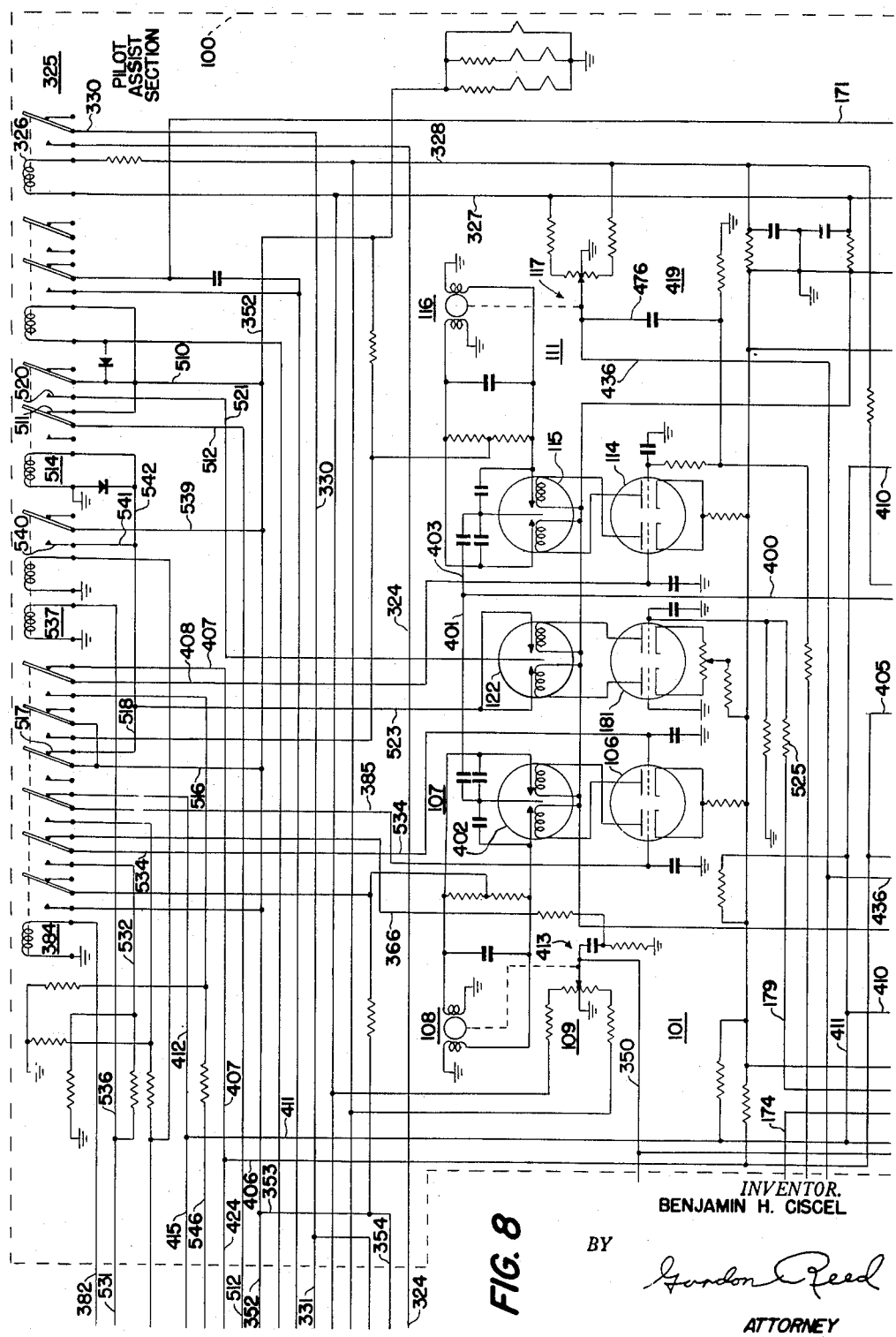
Figure 9:
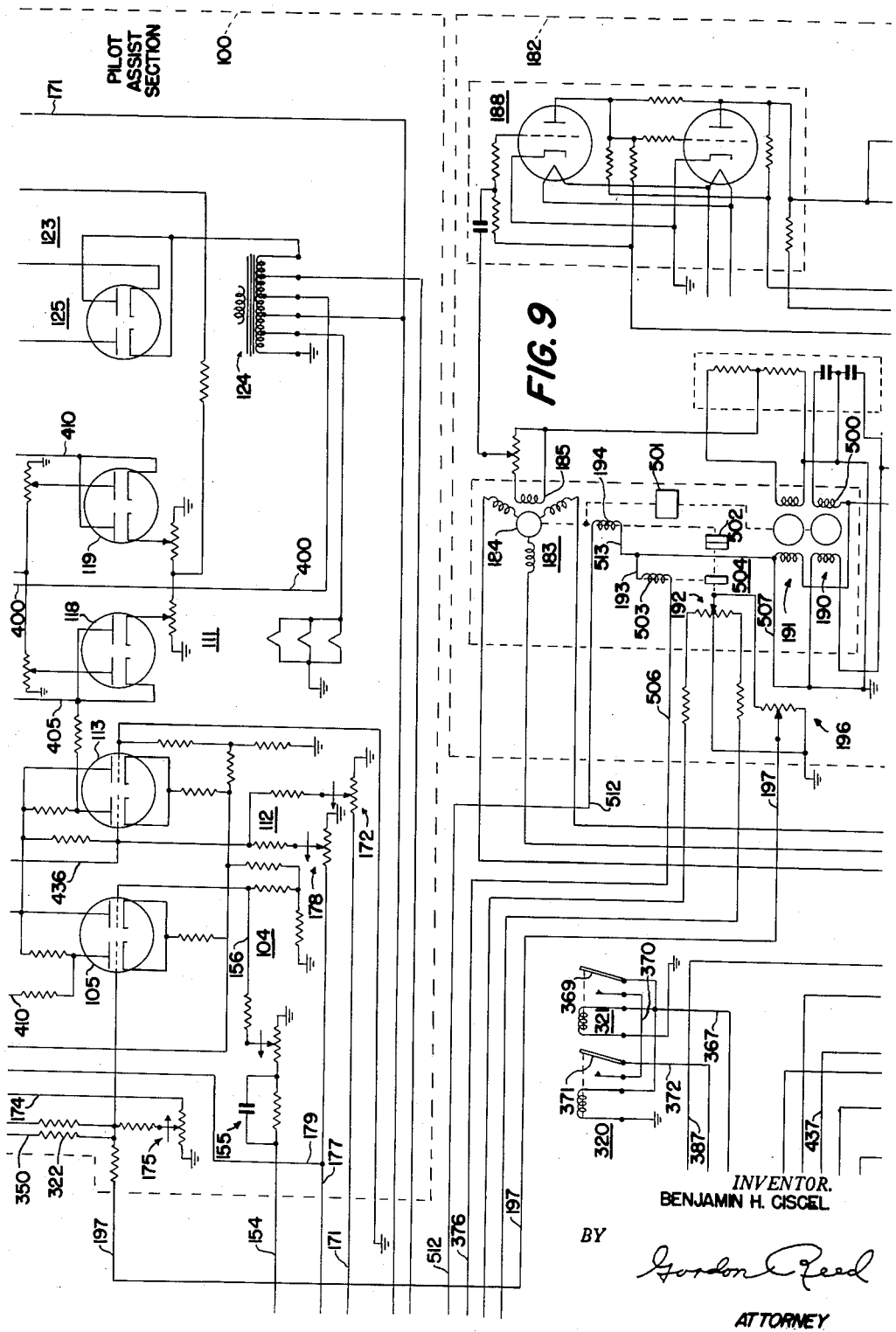

Jointly shown in Figures 8 and 9 is the pilot assist section 100. It comprises a roll attitude control section 101 and a pitch attitude control section 111 both for controlling the elevon control surfaces of the craft. The roll control section 101 comprises a control signal network 104, Figure 9, a summing amplifier 105, a control tube 106, Figure 8, a micro positioner relay 107, a synchronizer motor 108, a synchronizer potentiometer 109.

The pitch control section 111 comprises a control network 112, Figure 9, a summing amplifier 113, a control tube 114, Figure 8, a micro positioner relay 115, a synchronizer motor 116, and a synchronizer potentiometer 117.

Associated with the summing amplifier 113 is a limiter 118 and associated with the summing amplifier 105 is a similar limiter 119. Briefly, the pilot assist section contains two summing amplifiers which feed roll and pitch control signals to the pitch and yaw damper when the system is operated in the pilot assist mode.

The pilot assist section 100, in Figure 9, additionally includes a transformer and rectifier D.C. supply 123 comprising a transformer 124 and rectifier 125 which supplies the D.C. power for the pilot assist section and also for signal potentiometers in the pilot assist error sensing components to be described.

Figure 10:
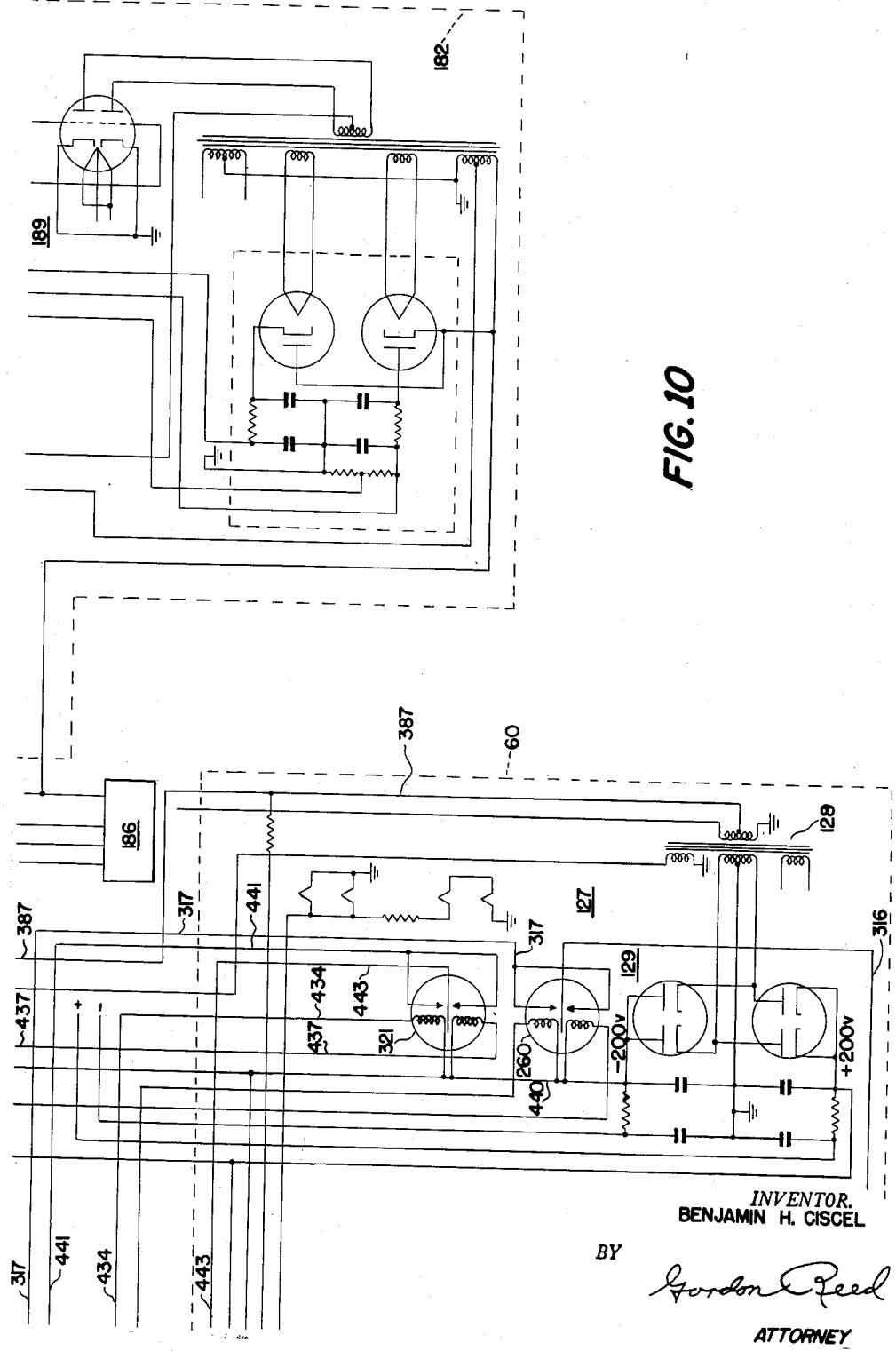

Similarly, the rudder section 60, Figure 10, includes a transformer and power supply 127 comprising transformer 128 and rectifier power supply 129 for the rudder, right elevon, and left elevon sections as well as for signal potentiometers in the pitch and yaw damper system.

Figure 5:
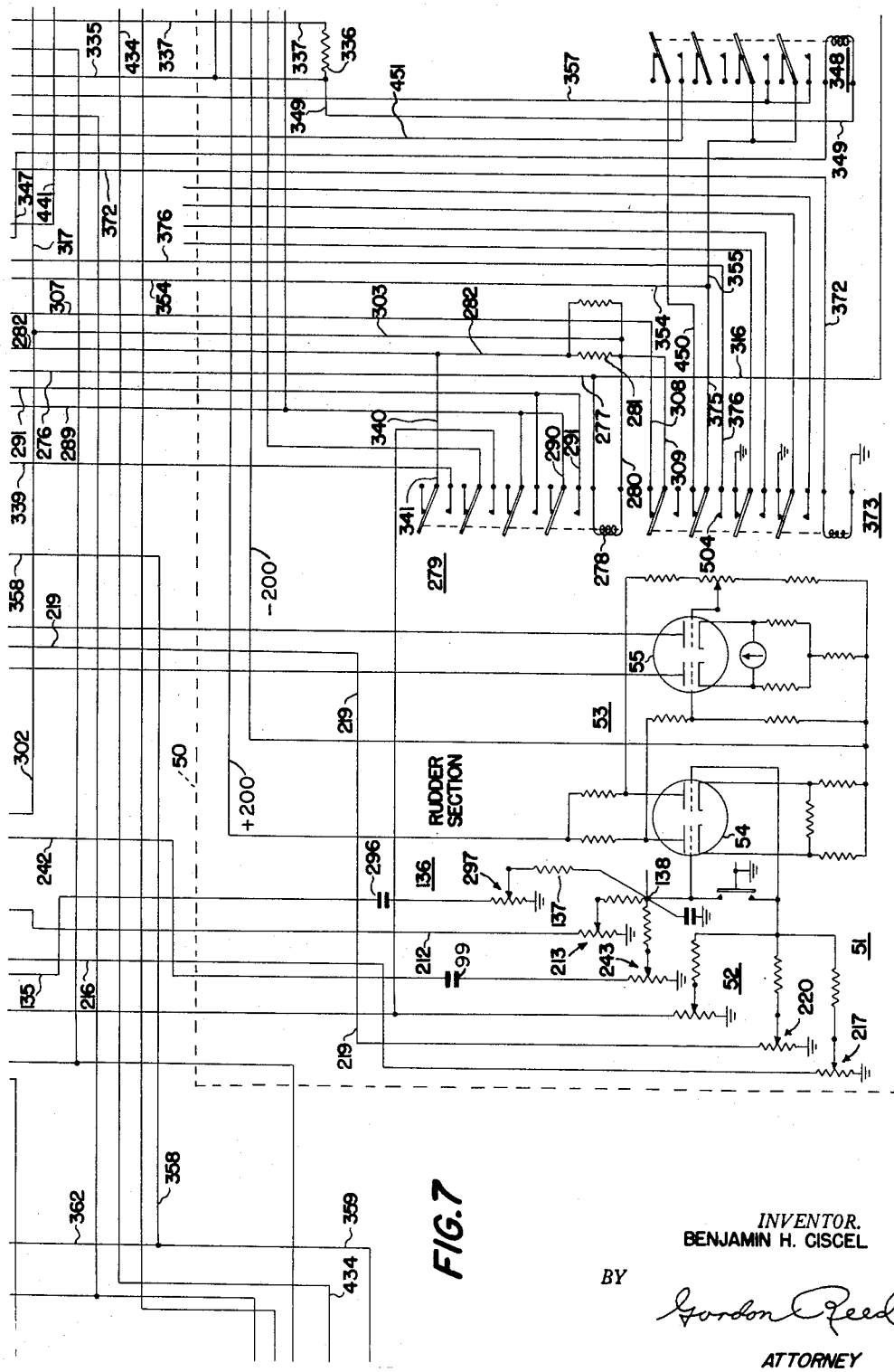

Control signals are obtained in Figure 5 from a yaw rate gyro 130, a pitch rate gyro 140, a roll rate gyro 150, a vertical gyroscope 160, a directional coupler 182, Figures 9 and 10, a left elevon position transmitter 200, Figure 6, a right elevon position transmitter 203, a lateral transmitter position 208, a left elevon stabilizer actuator position transmitter 230, a right elevon stabilizer actuator position transmitter 222, and a rudder stabilizer actuator position transmitter 218, as well as the synchronizer motor operated potentiometer 72, Figure 4; 92, Figure 3; 109, Figure 8; and 117, Figure 8 previously referred to.

Details of signal sources

The yaw rate gyroscope 130, Figure 5, conventionally comprises a rotor operated by a capacitor type induction motor 131 connected to an A.C. supply bus 134. The gyroscope includes a potentiometer 132 operated in accordance with the rate of yaw of the craft with the output of the potentiometer 132 being transmitted via conductor 135 and a high pass network 136, comprising capacitor 296, and conductor 137 to the left control grid of summing amplifier 54. The gyroscope 130 additionally includes an erection cutout switch 133 which controls the erection motor in the vertical gyroscope 160 for erecting the rotor axis thereof to the vertical. The pitch rate gyroscope 140, Figure 5, similarly comprises a rotor driven by a capacitor type induction motor 141 energized from the 115 volt A.C. bus 134. The rate gyro 140 includes a potentiometer 142 providing signals proportional to the pitch rate of the craft, and the output of the potentiometer is transmitted by conductor 143 and high pass network 145 including a resistor and a pitch ratio voltage divider 146 to the summing point 148 of the right elevon summing amplifier 64, Figure 4. The roll rate gyroscope 150, Figure 5, includes a rotor driven from a capacitor type induction motor 151 energized from the bus 134. The gyroscope includes a potentiometer 152 operated in accordance with the roll rate of the craft and having its output supplied by conductors 153, 154 and a combination rate and displacement network 155, conductor 156 to the right control grid of summing amplifier 105, Figure 9. Additionally the roll rate gyro output is supplied from energized conductor 153, Figure 6, conductor 240, and voltage divider 241, adjusted in accordance with the air speed of the craft, conductor 242, and voltage divider 243 to a summing point 138 connected to the left control grid of amplifier 54. The vertical gyroscope 160, Figure 5, is similar to that disclosed in the patent to Brown 2,645,129 dated July 14, 1953. This gyroscope comprises a rotor driven from a capacitor type induction motor energized from bus 134, a roll erection motor controller 162, a pitch erection motor controller 163, a limit switch arrangement 164, a pitch attitude potentiometer 165, a roll attitude potentiometer 166, an up elevator potentiometer 167, a roll erection motor 168, and a pitch erection motor 169. The pitch attitude potentiometer 165 includes a slider adjusted relative to the midpoint of its coacting resistor to develop signals in accordance with the magnitude and direction of the pitch attitude of the aircraft, and this slider is connected by conductor 171 and a voltage dividing potentiometer 172 to the left control grid of the summing amplifier 113, Figure 9. The roll attitude potentiometer 166 includes an adjustable slider which is displaced in either direction relative to the midpoint of its coacting resistor and to an extent in accordance respectively with the direction and magnitude of the roll attitude of the craft, and this slider is connected by conductor 174 and a vertical gyro roll attitude voltage divider 175 to the left control grid of summing amplifier 105, Figure 9. The potentiometer 167 includes a slider adjusted an amount relative to the midpoint of its coacting resistor in accordance with magnitude of the roll attitude of the craft. The slider provides a single polarity signal and is connected by conductor 177 and a voltage dividing potentiometer 178 to the left control grid of amplifier 113, Figure 9. The directional control coupler 182, Figures 9 and 10, receives heading signals from a conventional directional gyroscope which is slaved to a compass responsive to the earth's magnetic field. The compass-gyroscope combination 186 may be similar to that disclosed in the patent to Esval et al. 2,539,411 dated January 29, 1951. Such an arrangement in the patent includes a signal generator 31 of the "selsyn" type having a polyphase winding 32. Winding 32 therein is connected to a polyphase winding 184, of a synchro 183 in the directional coupler 182. Coacting with the polyphase winding 184 is a single phase winding 185. The synchro 183 may be a control transformer and error signals are developed in the single phase winding 185 proportional to deviations in heading from a desired heading. Such heading error signals are applied to a voltage amplifier 188 which controls a discriminator 189, Figure 10, that in turn controls the operation of a coupler motor 190, Figure 9, driving a velocity signal generator 191. Additionally, the motor 190 through a magnetic clutch 194 rotates the polyphase winding 184 relative to the single phase winding 185 to place it in a no signal condition. The motor 190 additionally operates a potentiometer 192, Figure 9, having its output applied across a maximum bank angle voltage dividing potentiometer 196. The output of the voltage dividing potentiometer 196 is supplied by conductor 197 and through a conventional summing resistor to the left control grid of summing amplifier 105, Figure 9.

The left elevon position transmitter 200, Figure 6, comprises a potentiometer having a slider and resistor with the slider displaced relative to the center tap of the resistor in either direction and to an extent in accordance respectively with the direction and displacement of the left elevon of the craft from a normal position, and the slider of the potentiometer is connected by conductor 201 and voltage dividing potentiometer 202, Figure 3, to the left control grid of amplifier 95.

The right elevon position transmitter 203, Figure 6, also comprises a potentiometer having an adjustable slider and resistor with the slider like the slider of transmitter 200 being displaced relative to the center of its resistor in accordance with the position of the right elevon of the aircraft from a normal position. The slider is connected by a conductor 204 and voltage dividing potentiometer 205, Figure 4, conductor 206 to the control signal network 62 connected to the left control grid of summing amplifier 75.

The lateral position transmitter 208, Figure 6, comprises a potentiometer having a slider and resistor with the slider being displaced relative to the midpoint of the resistor in accordance with the differential position of the left and right elevon control surfaces of the craft. The slider is connected by conductor 209 to a compensation network 210 in which energized conductor 209 is connected through one voltage dividing network 211 adjusted in accordance with the air speed of the craft, conductor 212, and the voltage dividing potentiometer 213 to summing point 138 of the left control grid of amplifier 54. Alternatively, a connection is effected from energized conductor 209, Figure 6, and a voltage dividing potentiometer 215 adjusted in accordance with the air speed of the craft, conductor 216 and voltage dividing potentiometer 217, Figure 7, to the right control grid of summing amplifier 54. The arrangement 210 is such that for high air speeds, no control signal will be applied over conductor 212, instead the control signal will be applied over conductor 216 to provide a negative rudder at high air speed. In other words, with the craft in a left bank the right rudder would be applied at high air speed and this is called negative rudder.

The left elevon stabilizer actuator position transmitter 230, Figure 6, comprises a potentiometer having a slider adjusted in direction and to an extent relative to a center tap of a potentiometer resistor connected to signal ground in accordance with the relative movements of the actuator ram and cylinder. A conductor 231 extends from the potentiometer slider to a voltage dividing potentiometer 232, Figure 3, and conductor 233 connects potentiometer 232 to the right control grid of summing amplifier 84.

The right elevon stabilizer actuator position transmitter 222, Figure 6, includes a potentiometer having a slider displaced relative to a center tap of its coacting resistor in accordance with the relative displacement of the ram and cylinder of the right elevon stabilizer actuator. A conductor 223 extends from the slider and connects with a conductor 224 and a voltage dividing potentiometer 225, Figure 4, to the right control grid of summing amplifier 64. The rudder stabilizer actuator position transmitter 218 comprises a slider and resistor to provide similarly a rudder stabilizer actuator position signal. A conductor 219 extends from the slider to a voltage dividing potentiometer 220 and thence through a conventional summing resistor to the right control grid of summing amplifier 54.

Pitch and yaw damper monitors

The pitch and yaw damper system includes various safeguards and monitoring devices to assure its proper operation. One damper monitoring arrangement 245, Figure 3, comprises a control tube 246, which is a double triode, on its right grid and a conventional micro positioner relay 247. The control tube 246 receives right elevon stabilizer actuator position signals from energized conductors 223, Figure 3, conductor 248 and a time delay network 249. Similarly a left elevon stabilizer actuator position signal is supplied from energized conductor 231, Figure 3, conductor 235, and time delay network 250 to the left control grid of the control tube 246. If there is a differential signal on the left and right grids of the control tube 246, due to a differential position of the left and right stabilizer actuators, one side of the control tube 246 will conduct a greater current than the other thereby energizing the windings of the micro positioner relay 247 in a differential amount whereby the armature of the micro positioner relay engages one or the other of its opposed contacts to disengage the pitch and yaw damper as will be more fully explained.

The damper system includes a further monitoring arrangement 252, Figure 4, comprising a control tube 253 which is a double triode and micro positioner relay 254. One grid of the control tube 253 is connected to ground, the opposite control grid receives right elevon stabilizer actuator displacement signals from energized conductor 224, Figure 4, through a time delay network 255. The time delay network 255 is arranged so that it requires the persistence of the actuator position feedback signal from potentiometer 222, Figure 6, for a predetermined time after which a differential current will flow through the two plate circuits of the control tube 253 thereby differentially energizing the two windings of the micro positioner relay 254 thus causing its armature to engage one or the other of its associated contacts to thereby disengage the damper system. In ordinary damper operation, the oscillations of the craft, due to transient disturbances, will be damped within the period of the time constant of the network 255 so that ordinarily the control tube 253 would not operate the micro positioner relay 254, because the actuator feedback signal would be returned to zero value when the oscillation discontinues. If there is a malfunction so that either stabilizer actuator remains displaced, the elevon would remain displaced and result in what may be considered a "hardover" operation in which case the attitude of the craft would continue to change. Inasmuch as tube 246 of the other monitor 245 responds to the positions of both stabilizer actuators, it is arbitrary which actuator position is applied to the left grid of control tube 253 of monitor 252.

A third form of monitoring in the pitch and yaw damper is that provided by the monitor relay 260, Figure 10, which is also a micro positioner relay. This relay is an electronic tube monitor and may be said to be a monitor for the two previously described monitors comprising tubes 246 and 253. The monitor arrangement comprising tube 246 as well as the monitoring arrangement comprising tube 253 depend for their operation on the absence of tube failure. If tube failure exists, neither monitor would function. Therefore, the relay 260 monitors both of the tubes 246 and 253. If both tubes are good or operative, total cathode current through each tube should be very nearly equal that through the other. Thus the micro positioner relay 260 would not operate. The relay 260 is connected in each cathode circuit of tubes 246, 253 in such manner that any appreciable difference in cathode current in each tube will pull the relay in thereby short circuiting the damper switch holding solenoid to be described.

Damper engagement

When the aircraft is operated in the direct manual mode, the rudder and elevon stabilizer actuators unlock solenoids 292, 293, 294, Figure 6, are de-energized. With solenoids 292, 293, 294 unenergized, hydraulic pressure to the stabilizer actuators is cut off and the hydraulic rams for the actuators are spring restrained at center as will be described hereinafter to form rigid links in the control system. The signal bridges are fully operational after the proper warm-up interval has elapsed and the torque motors 56, 66 and 86, Figure 6, for the stabilizer actuator control valves respond to error signals. Operation of the control valves at this time is entirely ineffective, however, since hydraulic pressure is cut off to the actuators. The damper can be engaged at any time after the proper warm-up period. The damper engage circuit includes various relays and contact making elements not heretofore described but considered more advantageously described in connection with the actual engagement of the damper system.

The damper engage circuit relies on a 28 volt source represented by a battery which is connected through a conventional switch to a main D.C. bus 265, Figure 5. From bus 265 the engage circuit extends from a conductor 266, thermal delay switch 267, Figure 3, delay switch contact 269, conductor 270, conductor 271, Figure 5, a normal accelerometer or pitch G limiter switch 272, Figure 6, conductor 273, the damper engage switch 274, which is a single-pole single-throw solenoid held switch held in the "manual" or operated position if there is no malfunction, conductor 275, conductor 276, Figure 6, conductor 277, Figure 7, operating winding 278, Figure 7, of the damper engage relay 279 (which is of the four pole, double-throw type), conductor 280, resistor 281, conductor 282, in contact of a single-pole single-throw relay 284, Figure 4, conductor 285, in contact of a single-throw single pole switch 286, to ground.

With damper engage relay winding 278 energized, a circuit is completed from energized D.C. conductor 266, Figure 5, conductor 288, conductor 289, damper engage relay arm 290, its coacting in contact, conductor 291, to the rudder actuator unlock solenoid 292 and the elevon actuators unlock solenoids 293, 294, Figure 6, and with the operation of solenoids 292, 293, 294 hydraulic pressure is transmitted into the control valves of the stabilizer actuators to operatively connect them with the surface actuators. Hydraulic pressure removes the centering spring restraint on the rams of the stabilizer actuators. At this point, the damper is engaged and fully operational.

Damper operation

Pitch damping is initiated by the pitch rate gyro 140, Figure 5, and this is the only input to the elevon signal control bridges during the "manual" mode of operation. Pitch rate signals from potentiometer 142, Figure 5, are supplied through conductor 143 to a high pass condenser 257 and thence through parallel paths to both elevon stabilizer actuators. One path which includes voltage dividing potentiometer 146 controls the right elevon stabilizer actuator and the other path which includes conductor 258, voltage dividing potentiometer 259, Figure 3, controls the left elevon stabilizer actuator. The arrangement provides in each instance or parallel path a high pass network. The high pass network is provided to attenuate steady state pitch rate signals thus preventing a sudden "bump" at the time of damper engagement.

When in the "manual" mode at which time the damper is engaged, the control stick of the craft, as shown in Figure 1, is the primary input to the elevon control system. As evident from Figure 1, the damper inputs from the stabilizer actuator to the surface actuator are summed with stick inputs, and the mechanical feedback from the surface actuator around the stabilizer actuator maintains elevon deflection proportional to the sum of damper and manual inputs. In effect, damper inputs are super-imposed on manual inputs and damping is entirely independent of stick position.

Yaw damping is initiated by the yaw rate gyroscope having its output from potentiometer 132, Figure 5, supplied by conductor 135 and high pass network 136, comprising the capacitor 296 and voltage divider 297, and conductor 137 to the summing amplifier 54. The summing amplifier controls servo amplifier 55 which energizes torquer 56. Torquer 56 controls a stabilizer actuator corresponding to actuator 22, Figure 1, which controls the control valve of the surface actuator. This actuator positions the surface and through the mechanical feedback which includes the stabilizer actuator repositions the surface actuator control valve.

In the rudder channel, the aircraft control pedals are the primary input to the rudder control system when the damper is engaged. As with the elevons, yaw damper inputs are super-imposed on manual inputs and damping is entirely independent of rudder pedal position.

Coordinated flight while in the "manual" mode during which mode the damper is operative, is obtained by operating the rudder automatically as the result of operation of the elevon surfaces. When the control stick, Figure 1, is moved laterally, the elevon surfaces are moved in opposite directions so that the lateral position transmitter 208, Figure 6, supplies a signal through compensation network 210, conductor 212, voltage divider 213, to the rudder signal summing amplifier 54. Thus, the yaw damper provides coordination of the rudder operation to the elevon operation during the entry into the turn, the steady state portion of the turn, and recovery from the turn to straight and level flight. The high pass filter 136 between yaw rate potentiometer 132 and summing amplifier 54 eliminates the steady state yaw rate gyro signal on summing point 138 so that rudder position is in accordance with elevon position. Turn entry coordination while facilitated by the aileron position signal is also aided by the signal from the roll rate gyro which latter is supplied from potentiometer 152, Figure 5, conductor 153, conductor 240, voltage divider 241, conductor 242, high-pass capacitor 99 and voltage divider 243 to the rudder signal summing amplifier 54. During the steady state phase of the banked turn, differential elevon position, roll rate, and steady state yaw rate signals are zero. The only inputs to the rudder servo amplifier 54 are the high passed yaw rate signals from high frequency aircraft oscillations. These high passed rate signals provide damping of such oscillations.

Yawing moments of the aircraft about its vertical or Z axis due to a differential aileron deflection which might increase the drag of the wing having the lowered elevon or due to rolling rate, change as air speed changes. In some aircraft, the yawing moment due to differential elevon deflection changes direction at high air speed and because of this it is necessary as by means of network 210, Figure 6, to change the effect on the operation of the rudder of differential elevon position and roll rate signals as a function of air speed in order to maintain coordination throughout the entire operating range of the aircraft.

Damper monitoring

When the damper engage switch 274, upper left Figure 6, has been operated, a circuit is completed from energized conductor 270, through the switch 274, the engage switch holding solenoid winding 300 thereof, conductor 301, conductor 302, conductor 303, Figure 7, resistor 281, conductor 282, relays 284, 286, to ground. Monitoring is provided to automatically disengage the damper due to loss of A.C. power; loss of B+ voltage, loss of bridge supply voltage on potentiometer 72.

Also, if malfunctions of several other types occur in the damper system, the damper engage switch holding solenoid 300, Figure 6, is shunted whereby the damper engage switch 274 moves to the unoperated position when released. One shunting circuit is effected by the micro positioner relay 247, Figure 3, responsive to differential displacement of the left and right stabilizer actuators as reflected by potentiometers 222, 230. Upon operation of micro positioner relay 247 a circuit extends from damper engage switch 274, Figure 6, conductor 275, conductor 305, micro positioner 247, conductor 306, Figure 5, conductor 307, Figure 6, conductor 308, Figure 7, an out contact of pilot assist engage relay 373, conductor 309, resistor 281, and completing a shunting circuit of holding solenoid winding 300 through conductor 282, conductor 283, relay 284, 285, relay 286, to ground.

Inasmuch as the damper engage relay operating winding 278, Figure 7, is electrically in parallel with the holding solenoid 300 of the damper engage switch 274, whatever shunts the holding solenoid winding 300 will also shunt the operating winding 278 so that it also becomes de-energized to return craft control to the direct manual mode.

In a similar manner the micro positioner relay 254, Figure 4, which is responsive to continued unbalance of control tube 253, serves to de-energize or by-pass the engage switch holding solenoid 300 through a circuit comprising damper engage switch 274, conductor 275, conductor 276, Figure 5, conductor 311, micro positioner 254, conductor 312, conductor 307, conductor 308, Figure 7, the upper out contact of the pilot assist engage relay 373, Figure 7, conductor 309, resistor 281, conductor 282, relays 284, 286 to ground.

When the pitch and yaw damper monitor micro positioner relay 260, Figure 10, operates, the solenoid holding winding 278 of the damper engage relay is shunted by energized conductor 276, conductor 277, Figure 8, conductor 316, micro positioner relay 260, conductor 317, conductor 303, Figure 7, resistor 281, conductor 282, relays 284, 286, to ground, whereby the solenoid holding winding 300 of the damper engage switch 274 is similarly shunted.

It should be noted that the monitoring from micro positioner relays 247 and 254 depend upon the non-operation of the pilot assist engage relay 373, Figure 7, whereas the monitoring from the micro positioner relay 260 is independent of the pilot assist engage relay 373. When pilot assist relay 373 is energized, the monitoring from relays 247, 254 is ineffective, to permit differential elevon positioning.

Pilot assist monitors

The pilot assist utilizes various monitors to prevent engagement of the pilot assist or cause disengagement thereof during malfunctioning.

The control signal system synchronizing motor 71, Figure 4, of the right elevon section operates a set of limit switches 76 and similarly the similar synchronizing motor 91, Figure 3, in the left elevon section operates a limit switch arrangement 96 to open a pilot assist engage circuit to prevent engagement of the pilot assist apparatus, in the event that the operation of either synchronizing motor has continued to such an extent that it has operated its limit switch but has been unable to balance the elevon surface displacement signals as from potentiometers 200, 203, Figure 6.

A second type of monitoring in the pilot assist apparatus is provided by the control tube 73, Figure 4, and the micro positioner relay 74. This monitoring arrangement is associated with a monitor for the mode changer or left elevon and right elevon feedback lock-out switches 320, 321, Figure 9. The lock-out switches 320, 321 prevent the mechanical feedback around the stabilizer actuator as described in connection with Figure 1 when engaging pilot assist along with the pitch and yaw damper. If the pilot assist engage relay 373, Figure 7, which makes through energized conductor 351, Figure 5, conductors 352, 353, 354, 355, the pilot assist engage relay 348, conductors 357, 367, energized lock-out switches 321, 320, conductor 372, and winding of relay 373 fails to pull in, indicating failure of the lock-out relays 320, 321 or the relay 373 itself, or if the relay 348 is in but the relay 373 is not, 28 volts D.C. is applied from energized conductor 354, Figure 7, conductor 375 through a set of in contacts of the relay 373, conductor 450, and a set of in contacts of the relay 348, conductor 451, lower in contacts of the relay 361 in the right elevon section, Figure 4, conductor 454 to control tube 73, Figure 4, which operates the micro positioner 74. The operation of the micro positioner relay 74 shorts the holding solenoid winding 333 for the pilot assist engage switch 332, Figure 6, as will be more fully brought out in connection with pilot assist operation.

Another form of monitoring in the pilot assist is provided by a micro positioner relay 321, Figure 10. This relay 321 is a monitor for the synchronizer motor control tubes 74 and 94 in the right elevon and left elevon sections respectively. If either tube fails, the relay 321 pulls in short circuiting the holding solenoid winding 333 for the pilot assist engage switch 332 to disengage the pilot assist system and return to the manual mode control.

*Pilot assist engaging*

The pilot assist engage switch holding solenoid circuit extends from D.C. bus 265, Figure 5, conductor 266, thermal delay switch 267, thermal delay contact 269, conductor 270, conductor 322, vertical gyro uncaging mechanism 164 including the make contact 323, conductor 324, an in contact of the B+ monitor relay 325, Figure 8 (having an operating winding 326 energized by conductors 328, 327 from rectifier 123), conductor 330, conductor 331, pilot assist engage switch 332 (which is of the solenoid held single-pole single-throw having a holding solenoid winding 333), conductor 334, conductor 335, resistor 336, Figure 7, conductor 337, synchronizing motor limit switch arrangement 96, Figure 3, conductor 338, synchronizing motor limit switch arrangement 76, conductor 339, an upper in contact of the pitch and yaw damper engage relay 279, conductor 341, upward through conductor 282, relays 284, 286 to ground. The energization of pilot assist engage switch holding solenoid winding 333 through the aforesaid circuit holds the pilot assist engage switch 332, Figure 6, in operated or closed position. A relay control circuit in parallel with the holding solenoid circuit also extends from pilot assist engage switch 332, conductor 344, a manually operable normally closed switch 345, terminal 346, conductor 347, the operating winding of pilot assist engage relay 348 (which is of the four-pole double-throw type), conductor 349, resistor 336, conductor 337, and through the synchronizing motor limit switches 96, conductor 338, limit switches 76, conductor 339, upper in contact of relay 279, conductor 340, upward on conductor 282 and relays 284, 286 to ground as set forth with respect to the circuit for the engage switch holding solenoid winding 333, thereby energizing relay 348.

On operation of relay 348 a circuit extends from D.C. bus 265, Figure 5, conductor 351, conductor 352, conductor 353, conductor 354, conductor 355, two parallel in contacts of relay 348, conductor 357, conductor 358, conductor 359, the operating winding of right elevon section relay 361, Figure 4 (which relay is of the four-pole double-throw type), to ground. Operation of relay 361, inter alia, disconnects synchronizing motor 71 from micro positioner relay 74. Simultaneously, a circuit is completed from energized conductor 358, conductor 362, operating winding of a left elevon pilot assist engage relay 364, Figure 3 (which is of the six-pole double-throw type) to ground. Operation of relay 364 disconnects motor 91 from positioner relay 94. At this time also, a circuit is extended from energized conductor 357, Figure 6, conductor 367, to the operating windings for the left elevon lock-out relay switch 320 and the right elevon lock-out relay switch 321 (both of which are of the single-pole single-throw type), to ground. Relay switches 320, 321 effect mode change to pilot assist to increase the authority of the elevon stabilizer actuators.

Extending rightward from the energized conductor 367, Figure 6, operated relay arm 369, conductor 370, operated relay arm 371, conductor 372, through an operating winding of a pilot assist engage relay 373 (of the four-pole double-throw type), to ground is the circuit for energizing the pilot assist engage relay 373.

With the energization of pilot assist engage relay 373, a circuit extends from energized conductor 354, Figure 7, conductor 375, an in contact 504 of relay 373, conductor 376, conductor 377, conductor 378, to an operating winding of a double-pole double-throw aileron channel relay 379 and simultaneously to an operating winding of a three-pole double-throw relay 381. At the same time a circuit extends from energized conductor 377, Figure 5, conductor 382, to an operating winding of a pilot assist engage relay 384, Figure 8, which is of the six-pole double-throw type.

*Synchronizing pilot assist*

Prior to manual operation of the pilot assist engage switch 332, Figure 6, an A.C. voltage had been supplied from transformer 128, Figure 10, conductor 387, conductor 388, to a capacitor and an out contact of relay 361, conductor 389, to the armature of the micro positioner relay 74, conductor 390, a second out contact of relay 361 to the synchronizing motor 71, Figure 4, to operate it in one direction and also through the micro positioner 74 and a second conductor 391 and a third out contact of relay 361 to energize synchronizing motor 71 in the opposite direction thereby causing the operation of synchronizing potentiometer 72 to balance the right elevon surface position feedback signal on voltage divider 205.

In a similar manner, A.C. was supplied from energized conductor 387, Figure 6, secondary conductor 393, capacitor 394, Figure 3, an out contact of the left elevon pilot assist engage relay 364, conductor 395, to the armature of micro positioner relay 94 and thence either through conductor 396, to another out contact of relay 364 to synchronizing motor 91 to cause its operation in one direction and alternatively through micro positioner 94, conductor 397, a further out contact of relay 364, to synchronizing motor 91 to effect operation thereof in the opposite direction whereby the output of the potentiometer 92 driven by the motor 91 is used to balance the left elevon surface feedback position signal.

Also during the period when the pilot assist is not engaged, signals from the pitch attitude potentiometer 165, Figure 5, the roll attitude potentiometer 166, and the up elevator potentiometer 167 are operated in response to operation of the vertical gyroscope 160 in response to attitude changes of the aircraft. The signals from potentiometers 165 and 167 are applied as stated to the pitch attitude control summing amplifier 113, Figure 9. The output of the amplifier 113 is supplied by conductor 405, conductor 406, conductor 407, an out contact of the pilot assist engage relay 384, Figure 8, conductor 408, to one control grid of the pitch synchronizer control tube 114. The control tube 114 operates the micro positioner relay 115 so that the armature thereof engages one or the other of its opposed spaced contacts whereby a circuit is completed from transformer 124, Figure 9, conductor 400, conductor 403, micro positioner 115, to effect energization of synchronizer motor 116 in one direction to operate the synchronizer potentiometer 117 to give one polarity of control signal. The output of potentiometer 117 is transmitted by conductor 436 to the left control grid of the pitch synchronizer control tube 114 and through conductor 436 to tube 113. The synchronizing potentiometer signal is applied through a rate network 419, Figure 8, to the control tube grid. Summarizing, the signal that controls the control tube 114 results from the operation of the pitch summing amplifier 113, having its output transmitted by conductors 405, 406, 407, an out contact of the pilot assist engage relay 384, conductor 408, to the left control grid of the control tube 114.

In a similar manner the roll attitude control signal from potentiometer 166 via conductor 174 is applied to the roll summing amplifier 105. Its output is applied through conductor 410, conductor 411, conductor 412, an out contact of relay 384, conductor 385, to the left control grid of roll synchronizer control tube 106. Tube 106 operates the micro positioner relay 402, Figure 8, to effect operation of the synchronizer motor 108 from a circuit comprising energized conductor 400, Figure 9, conductor 401, alternative paths through micro positioner relay 402, synchronizer motor 108, to ground. Motor 108 operates its synchronizer potentiometer 109 which has its output supplied through a rate network 413, conductor 366, an out contact of relay 384, conductor 534, to the right control grid of synchronizer control tube 106 and through conductor 350 and resistor 322 to tube 105. Thus, it is apparent that the synchronizers in the pilot assist section 100 balance the vertical gyro signals to synchronize the pilot assist section with the existing attitude of the aircraft.

Pilot assist control of craft roll

After the pilot assist relays 361, 364 and 384 have been energized, the output of the summing amplifier 105, Figure 9, due to change in craft attitude is transmitted by conductor 410, conductor 411, conductor 415, conductor 416, voltage dividing potentiometer 417, conventional summing resistor 418, to the left control grid of right elevon summing amplifier 75, Figure 4. Similarly the roll attitude control output voltage of summing amplifier 105 is applied from conductor 415, conductor 420, voltage divider 421, Figure 3, conventional summing resistor 422, to the right control grid of left elevon summing amplifier 95. It is now apparent that when the roll attitude control signal is applied to the left control grid of tube 75 and to the right control tube of summing amplifier 95, that a differential deflection of the elevons occurs whereby an aileron effect is accomplished. This may also be accomplished by changing the polarity of the roll signal in the left elevon signal bridge while feeding roll signals directly into the right elevon signal bridge. The elevons must move in equal but in opposite directions in response to the roll signals.

Pilot assist control of craft pitch attitude

In a similar manner the pitch control signals from pitch summing amplifier 113, Figure 9, are transmitted by conductor 405, conductor 406, conductor 424, conductor 425, voltage dividing potentiometer 426, conventional summing resistor 427, to the left control grid of right elevon summing amplifier 75. Similarly the output from the pitch summing amplifier 113 is transmitted from energized conductor 424, conductor 429, voltage dividing potentiometer 430, Figure 3, conventional summing resistor 431, to the left control grid of left elevon summing amplifier 95. Since the control signals from the summing amplifier 113 are applied to the same control grids of elevon summing amplifiers 75 and 95, both elevon control surfaces will be displaced in the same direction and in proportion to the magnitude of the control signal. This proportional movement of the elevon surfaces while on Pilot assist is obtained by the provision of the surface position feedback potentiometers 200 in the left elevon section and 203 in the right elevon section while the mode changer prevents, as stated, the mechanical feedback to the surface actuator control valve.

Pilot assist monitoring operation

The pilot assist monitoring control tube 73, Figure 4, of the right elevon section has its cathode circuit connected through conductor 434, conductor 433, one operating winding of micro positioner relay 321, conductor 440, Figure 10, to the −200 volt side of the rectifier 127. In a similar manner the pilot assist monitoring control tube 93 in the left elevon section, Figure 3, has its cathode connected through conductor 437, conductor 435, to the opposite winding of the micro positioner 321, conductor 440, to the −200 volt side of the rectifier 127. If either control tube 73 or 93 fails, the micro positioner 321, Figure 10, will be operated whereby its armature will engage one or the other of its adjacent contacts. When the micro positioner 321 operates, solenoid hold winding 333, Figure 6, of the pilot assist engage switch 332 is shunted by a circuit comprising conductor 344, switch 345, terminal 346, conductor 441, micro positioner 321, conductor 443, conductor 335, resistor 336, conductor 337, limit switch 96, conductor 338, limit switch 76, conductor 339, a damper engage relay in contact, conductor 340, conductor 282, relays 284, 286 to ground. Upon de-energization of solenoid hold winding 333 of the pilot assist engage switch, the switch moves to the open position thereby disengaging the pilot assist.

As indicated previously, if the pilot assist engage relay 373, Figure 7, fails to pull in, indicating possible failure of the left elevon and right elevon lock-out relays 320, 321, which effect mode change from manual to pilot assist, 28 volts D.C. is supplied from bus 265, Figure 5, conductor 351, conductor 352, conductor 353, conductor 354, conductor 375, a set of out contacts of relay 373, conductor 450, a set of in contacts of relay 348, conductor 451, resistor 452, resistor 453, an in contact 484 of pilot assist engage relay 361, conductor 454, to the right control grid of control tube 73. The left control grid of tube 73 is connected through conductor 456 and an in contact of relay 361 to ground. This action results in a slight difference in voltage on the two grids of control tube 73, Figure 4, whereby the micro positioner relay 74 is operated completing a circuit from terminal 346, Figure 6, conductor 457, beginning in Figure 6 and reappearing in Figure 4, in contact 458 of relay 361, conductor 389, micro positioner 74, conductor 390, relay in contact 460, conductor 461, conductor 462, conductor 335, resistor 336, Figure 7, conductor 337, and through the remainder of the pilot assist engage circuit to ground to by-pass the holding solenoid winding 333 of the pilot assist engage switch.

The pilot assist monitoring control tube 93, Figure 3, during the period when the pilot assist engage relay 364 is energized receives the output of the summing amplifier 95 by conductor 465, conductor 466, conductor 467, resistor 468, resistor 469, relay in contact 470, conductor 471, to the right control grid of control tube 93. Upon a persistent output of tube 95 so that capacitor 472 connected to relay contact 470 becomes fully charged, an unbalance of the currents of control tube 93 results effecting operation of the micro positioner 94. Upon operation of micro positioner 94 a circuit extends from energized terminal 346, Figure 6, conductor 474 beginning therein and reappearing in Figure 3, relay contact 475, conductor 395, micro positioner 94, conductor 396, relay in contact 478, conductor 479, conductor 462, conductor 335 and through the remainder of the pilot assist engage circuit, thereby shunting the holding solenoid 333 of pilot assist engage switch 332 whereby the engage switch 332 when released moves to its unoperated position.

In a similar manner the control tube 73, Figure 4, and micro positioner 74 monitor continued or persistent output of the summing amplifier 75 in the right elevon section which continued output indicates a malfunction. The output of summing amplifier 75 is supplied through a voltage dropping resistor and conductor 481, conductor 482, resistor 483, resistor 453, relay contact 484, conductor 454, to the right control grid of tube 73. A capacitor 485 connected between relay contact 484 and ground along with resistor 453 form a time delay device. If the amplifier 75 continues to provide an output which persists beyond the time constant of the resistor 453 and capacitor 485, its continued output indicates a malfunction, and the control tube 73 operates and energizes the micro positioner 74. Operation of micro positioner 74 completes the circuit from energized terminal 346, Figure 6, conductor 457, relay contact 458, conductor 389, micro positioner 74, conductor 390, relay contact 460, conductor 461, conductor 462, Figure 6, conductor 335, resistor 336, conductor 337, through the remainder of the pilot assist engage circuit to ground thereby shunting the holding solenoid 333 of the pilot assist engage switch 332 whereby the switch when released moves to the unoperated position and disengages the pilot assist.

Heading stabilization

The pilot assist apparatus provides heading stabilization of the aircraft means of the directional coupler 182, Figures 9 and 10. The directional coupler receives directional information from the gyroscope compass system 186 through the synchro receiver 183. The heading error signals in synchro 183 control the coupler motor 190 which drives through gear train 501 to reposition the three or polyphase winding 184 of the synchro at which time the signal disappears. By means of the magnetic clutch 194, the coupler output potentiometer 192 is connected to motor 190. The drive for the potentiometer 192 includes a friction clutch 502 and a recentering arrangement 504. The centering arrangement includes an operable winding 503 which retracts a follower from a heart-shaped cam (shown in edge view) in the mechanism 501, but when the winding 503 is de-energized, the follower is biased to engage the periphery of the cam in the mechanism 501 to recenter the slider of potentiometer 192. This type of centering arrangement is old in the art being disclosed in an application of Paul F. Shivers, Serial No. 726,008, filed February 3, 1947. By means of the centering arrangement, potentiometer 192 is not spring loaded during the period of its operation from coupler motor 190.

The follower retracting coil 503 is energized upon the energization of the pilot assist engage relay 373, Figure 7, from a circuit comprising energized conductor 352, Figure 5, conductor 353, conductor 354, conductor 375, relay 373, contact 504, conductor 376, conductor 506, winding 503, conductor 193, conductor 507, to ground. The winding of the magnetic clutch 194 is energized from a circuit comprising energized conductor 352, Figure 6, conductor 510, Figure 8, relay out contact 511 of the heading disengage relay 514 (which is a two-pole double-throw type), conductor 512, winding 194, conductor 513, conductor 507, to ground. Thus, whenever the heading disengage relay 514, Figure 8, is energized, the winding of the magnetic clutch 194 in the directional coupler 182 is de-energized disconnecting coupler motor 190 and potentiometer 192.

Relay 514 is energized in one instance through an out contact in the pilot assist relay 384, Figure 8, whenever the pilot assist is disengaged, through a circuit comprising energized conductor 352, conductor 516, relay 384, out contact 517, conductor 518, the operating winding of relay 514, to ground. The pilot assist is disengaged by manually opening switch 345, Figure 6, and if desired the control stick 10 is moved to effect manual changes in heading.

The energization of relay 514 is secondly provided by an aircraft bank angle monitoring arrangement, during selected turns from control stick 10, comprising control tube 181, Figure 8, and micro positioner relay 122. When unequal currents flow in the two windings of the micro positioner, relay 514 is energized the circuit comprises energized conductor 352, conductor 510, in contact 520 of relay 514, conductor 521, micro positioner 122, conductor 523, conductor 542, relay operating winding 514, to ground.

This micro positioner relay 122 has no effect on the circuit energizing relay 514 when the heading control mode is actually engaged, and it is impossible for this micro positioner relay 122 to disengage the heading mode once it has been so engaged. It serves, however, as a means for providing a holding circuit to the heading disengage relay 514.

The control tube 181 which controls the micro positioner 122 receives bank angle signals from the vertical gyro up elevon potentiometer through a circuit comprising potentiometer 167, Figure 6, conductor 177, conductor 179, summing resistor 525 to the right control grid of tube 181. The arrangement is such that up elevon signals from potentiometer 167 corresponding roughly to 5 degrees of bank angle unbalance the plate current in tube 181 sufficiently to operate the micro positioner 122. This in turn energizes heading disengage relay 514 if the pilot assist engage relay 384 is not previously energized. The purpose of relay 514 at this time is to permit auttomatic heading stabilization establishment after switch 345, Figure 6, has been reclosed if the craft is within 5 degrees of level roll attitude.

Roll trim

When the pilot assist engage relay 384, Figure 8, is energized, aileron channel relay 379 and elevon channel relay 381, Figure 5, are simultaneously energized therewith via energized conductor 376, conductor 377, conductor 378. An elevon trim switch 528, Figure 5, having four effective positions (two of which are related to the left and right banking of the aircraft) can be used to trim roll attitude after engagement of the pilot assist. Engaging the (L.B.) left bank contact completes a circuit from energized conductor 351, conductor 529, selector switch 528, conductor 530, aileron channel relay 379, conductor 531, conductor 532, relay 384, conductor 534, to the right grid of amplifier 106 controlling the roll synchronizer motor relay 402. The relay 402 thereby energizes the roll synchronizer motor 108, Figure 8, to adjust the roll synchronizer potentiometer 109. When the roll synchronizer potentiometer signal changes, the aircraft must change roll attitude until the vertical gyro roll attitude signal again balances the synchronizer signal.

Since the aircraft heading is responsive to a change in bank angle or roll attitude, the directional coupler 182 is disengaged automatically from control of the craft whenever the selector 528 is operated to trim roll attitude. This disengagement of the heading control is effected from a circuit comprising energized conductor 531, Figure 5, conductor 536, aileron channel left bank relay 537, to ground. The operation of relay 537 completes a circuit from energized conductor 352, Figure 5, conductor 539, relay contact 540, conductor 541, conductor 542, heading disengage relay 514 to ground thereby energizing the heading disengage relay 514 and opening the energizing circuit for winding 194 of the magnetic clutch in the directional coupler 182. If the aircraft is in a 5 degree bank angle or roll attitude or less when the selector 528 is moved to its inoperative position, the directional coupler is automatically engaged. If bank angle exceeds 5 degrees, however, the aircraft continues in the turn. A similar effect results from positioning selector 528 so that the (R.B.) right bank contact is engaged.

Pitch trim

When the selector 528 engages the "DN" down contact a circuit is completed from energized conductor 529, selector switch 528, conductor 544, an in contact of relay 381, conductor 546, and an in contact of relay 384, conductor 408 to the left control grid of pitch synchronizer motor amplifier 114. The energization of amplifier 114 and the resulting operation of micro positioner relay 115 energizes the pitch synchronizing motor 116 which adjusts its potentiometer 117. When the synchronizer potentiometer signal changes, the aircraft must in turn change pitch attitude downward until the vertical gyro pitch attitude signal balances the synchronizer potentiometer signal. In a similar manner, moving the selector 528 to engage the "UP" contact changes the pitch attitude upwardly.

*Hydraulic servo*

A type of hydraulic stabilizer actuator 548 suitable for the purpose is shown in Figure 11. This actuator corresponds, for example, to that utilized in the rudder channel and includes a control valve which is operated by the torque motor 56. The actuator 548 comprises a power section 549, a valve section 550 and a control section 551 which includes a torque motor. In the arrangement the source of pressure is applied over conduit 560 and the return is through conduits 566 and 567. When there is no pressure in conduit 560, centering springs 552 and 552 in power section 549 engage flanged members 553 and 554 forcing them toward the center. The members 553 and 554 engage a circumferentially enlarged portion 556 of ram 555 thereby centering the ram in power section 549. With the ram thus centered the actuator 548 may function as a rigid link between lever 18 and valve 23, Figure 1, for example.

When pressure is applied to conduit 560 due to energization of the solenoid valve 292, pressure is transmitted through conduit 560 and hydraulic pressure is applied through a central passage to ram 555 and causes the outward displacement of members 553 and 554 respectively while compressing the springs 552 and 552. The ram 555 remains as positioned in the center. Pressure fluid also passes through a circumferential slot 559 about a land of control valve 558 and through passage 561 and 561 each having restriction therein to control nozzles 562 and 563. If the torque motor 56 be energized, it adjusts a damper valve 564 differentially with respect to nozzles 563 and 562. Any fluid passing through nozzles 562 and 563 exhausts through conduits 570 which communicates through a circumferential passage to exhaust or return conduit 566.

As the damper valve 564 is moved toward the right, or nozzle 562, the pressure in nozzle 562 exceeds that in nozzle 563, thus exerting a pressure on the right end of valve 558 which exceeds that on the left end of valve 558 causing it to move leftwardly. The flow from pressure line 560 passes through control valve 558 and through passage 564 forcing the ram 555 leftwardly. At the same time, the fluid from the left end of ram 555 passes through return conduit 565 which is now in communication with passage 566 to the return. As the ram 555 is displaced leftwardly the potentiometer 218 is adjusted in accordance with the relative displacement of ram 555 and valve 548. Thus, a rebalance signal is obtained from operation of the stabilizer actuator as well as an operation to position the main valve, Figure 1.

A similar type of servomotor or actuator may be utilized to operate each main control valve of the servo actuator operating each elevon control surface. In each case a rebalance signal will be provided for each stabilizer actuator.

Having considered the pitch and yaw damper as well as pilot assist details and the combined damper and pilot assist, it will now be apparent to those skilled in the art that a novel control system specifically applied to an aircraft has been provided wherein a pitch and yaw damper portion of the system may be utilized along with the manual control of the craft for damping pitch and yaw oscillations and which damper portion may also be utilized in combination with a pilot assist arrangement to provide a three-axis automatic pilot for an aircraft. An important feature is that operable limited authority is provided the stabilizer actuators on damper only but increased authority is provided with actuators in the three axis autopilot configuration. Furthermore, there has been included in this damper portion separately and in combination novel means to guard against malfunction of the apparatus.

While only one embodiment of the invention has been illustrated and described, it is to be expressly understood that the invention is not limited thereto since various changes can be made in the design and arrangements of the parts without departing from the spirit and scope of the invention, therefore, what is claimed is:

1. Monitoring means for an automatic pilot comprising: a first and a second balanceable network; a first and second actuator means respectively separately controlled by the first and second networks; an actuator displacement feedback from each actuator means to its control network; further means for controlling the supply of power to both actuators; and means responsive to a difference in displacements of said actuators for rendering the further means ineffective to supply both said actuators.

2. Monitoring means for an automatic pilot comprising: a pair of balanceable networks; a pair of hydraulic actuators each having a control valve; a pair of valve operators one for each control valve and one operator controlled by one network and the other by the other network; further means controlling the supply of fluid to both control valves; a followup in each network operated in response to displacement of its corresponding actuator; and means for controlling said further means to prevent supply of fluid to said valves if said actuators have unequal displacements.

3. Monitoring means for an automatic pilot of an aircraft, said craft having a pair of attitude control surfaces; in combination a first hydraulic actuator controlling one surface, a second hydraulic actuator controlling the second surface; a first network means controlling one actuator, a second network means controlling the other actuator; condition responsive means unbalancing both networks; further means for controlling the supply of power to be applied by each network means to its actuator; and means responsive to non-synchronism of said hydraulic actuators displacements for rendering said further means ineffective to supply power to said actuators to prevent relatively different displacements of said actuators so that craft attitude changes due from such displacements in altered about but one axis.

4. In an aircraft having operable means to alter craft attitude, damping apparatus to improve the dynamic stability of the craft comprising: a servomotor means controlling the position of said attitude altering means; an amplifier controlling operation of said servomotor means; a craft angular rate sensing device; balanceable circuit means responsive to effects both from said rate device and displacement of said servomotor means, operating said amplifier; a further means responsive simultaneously with said amplifier to said circuit means for rendering said servomotor means ineffective to control further said attitude altering means upon a continued unbalance effect on said circuit means from said displaced servomotor means.

5. In control apparatus having a servomotor for altering a condition, in combination: a signal generator operated by said servomotor in accordance with its displacement from center, a means responsive to said displacement signal for controlling said servomotor; means for sensing a change in a condition also controlling said responsive means; and further means simultaneously energized with said responsive means by said displacement signal generator including a time delay means for rendering said servomotor ineffective further to change said condition upon continued presence of said displacement signal indicating continued out of center position of the servomotor.

6. In an aircraft having a pair of control surfaces similarly displaced to change craft attitude, in combination: a servomotor means operating one surface, a second servomotor means operating said other surface, a first network means controlling the first servomotor means, a second network means controlling the other servomotor means, means responsive to displacement of the first servomotor means for controlling the first network, means responsive to the other servomotor means displacement for controlling the other network, further means for rendering each servomotor means effective on its surface; means associated with said further means responsive to a difference in the effect of each surface in changing craft attitude to cause both servomotors to be ineffective on the surfaces, and additional lag network means associated with said further means and operative upon continued unbalance of one of said network means to render both said servo means to be ineffective on their surface.

7. In an aircraft having a pair of control surfaces similarly displaceable to change craft attitude about an axis thereof, in combination: a first servomotor means operating one surface, a second servomotor means operating said other surface, an amplifier controlling the first servomotor means, a second amplifier controlling the second servomotor means, a balanceable network controlling the first amplifier, a second balanceable network controlling the second amplifier, further means for rendering each servomotor means effective on its surface; means associated with said further means and responsive to a difference in the effect of each servomotor means on said craft attitude for causing both servomotor means to be ineffective on the surfaces; and additional means associated with said further means and operative upon continued unbalance of one amplifier network to render both servomotor means ineffective on the surfaces.

8. In the apparatus of claim 7, and auxiliary means associated with said further means and responsive to said first and second amplifiers and effective on difference in currents in said amplifiers for also rendering said servomotor means ineffective on said surfaces.

9. Control apparatus for an aircraft having surfaces for controlling bank angle and heading of the craft and having means operating said surfaces, in combination: a vertical gyro sensing craft bank angle; a directional sensitive device; and amplifier means biased by said gyroscope and responsive to craft bank angle for preventing control of said operating means from said directional responsive device when said craft bank angle exceeds a predetermined minimum value.

10. In an automatic pilot for an aircraft which may be operatively connected to attitude control means of the craft, in combination: a vertical gyroscope responsive to roll and pitch of the craft and operating through said automatic pilot to stabilize pitch and roll attitude, a directional maintaining means for stabilizing craft heading, a signal generator developing a unidirectional voltage from said gyroscope upon bank of the craft in either direction, and means responsive to said signal generator when its output exceeds a predetermined minimum value for preventing said direction maintaining means from controlling said automatic pilot, and further means controlled by said signal generator for operating the pitch attitude control means of the craft.

11. In an aircraft having attitude changing devices and manually operable control means for operating said devices to manually change craft attitude, in combination: means including a balanceable circuit adapted for operative connection to and disconnection from said attitude changing devices; attitude responsive means; means connecting said attitude means to said balanceable circuit for controlling said means; a servo mechanism responsive to said circuit during manual control of craft attitude to rebalance said circuit; and means responsive to displacement of said servo mechanism beyond a predetermined extent from a normal position to prevent operative connection of said means to said devices.

12. Control apparatus for an aircraft having two attitude control devices operable in the same or in opposite directions to control craft attitude about two respectively perpendicular axes thereof, in combination: a first servo-motor means operating one surface; a second servomotor means operating the other surface; an amplifier for the first servo-motor means, an amplifier operating the second servomotor means, each amplifier having two signal input control sections; attitude responsive signal providing means responsive to craft tilt about both axes; connecting means for applying the signal from said attitude responsive means due to tilt about one of said axes to the same signal input control sections of both amplifiers; and means for applying the signal from said attitude responsive means due to tilt of the craft about the second axis to opposite signal input control sections of said amplifiers.

13. Control apparatus for an aircraft having two attitude control devices operable in opposite directions to control craft attitude about an axis thereof, in combination: a servomotor means operating one surface, a second servomotor means operating the other surface; a motor controller, operable in either of two directions, for controlling the direction of operation of each servomotor; a torque motor for the first motor controller, a torque motor for the second motor controller, each torque motor having a pair of energizable windings to control the direction of operation of the motor controller; an amplifier operating the first torquer; a second amplifier controlling operation of the second torquer, each amplifier having two signal input control sections; attitude responsive signal providing means responsive to tilt of the craft about said axis; and means for directly applying said attitude responsive signal without phase reversal to opposite input control sections of said two amplifiers whereby one motor controller operates in one direction and the remaining motor controller operates in the opposite direction whereby said attitude control devices are moved in opposite directions.

14. Control apparatus for an aircraft having roll attitude changing means, said apparatus comprising: a servomotor means operating said attitude changing means; roll attitude responsive means controlling said servomotor means; heading responsive means; further means connecting said heading responsive means to said servomotor means; additional means responsive to said tilt of the craft about its roll axis and associated with said further means for preventing control of said servo means from said heading responsive means; and further means for varying the attitude at which said attitude responsive means maintains said craft roll attitude.

15. Control apparatus for an aircraft having roll attitude changing means, said apparatus comprising: a servomotor means controlling said attitude changing means; attitude responsive means controlling said servomotor means; heading responsive means additionally controlling said servomotor means; means for varying the attitude at which said attitude responsive means maintains the roll attitude of the craft; means responsive to operation of said roll attitude changing means for severing control of said servomotor means from said heading responsive means; and further means responsive to the tilt of the craft beyond a predetermined roll attitude for continuing the severance of said heading responsive means from said servomotor means when said attitude changing means is returned to an operated position.

16. In an aircraft having a pair of control surfaces similarly displaceable or oppositely displaceable to change craft attitude about two axes; a servomotor means operating each surface; an amplifier controlling one servomotor means, a second amplifier controlling the other servomotor means, a balanceable network controlling one amplifier, a second balanceable network controlling said other amplifier; a rate gyroscope controlling each network; means responsive to differential displacement of both said servomotor means for rendering said servomotor means ineffective to control said surfaces; attitude responsive means controlling both said networks, and means responsive to application of control from said attitude responsive means to said networks for preventing severing of said servo means control of said surfaces during differential displacement of said servomotor means.

17. The apparatus of claim 16, and means responsive to differential displacement of said control surfaces for causing operation of a rudder surface of said aircraft to effect coordinated turns.

18. In an aircraft having a pair of control surfaces oppositely displaceable from a normal position to cause banking of said craft, in combination: a servomotor means operating one surface, a second servomotor means operating the other surface; an electronic amplifier controlling the first servomotor means, a second electronic amplifier controlling the second servomotor means, each amplifier having a double triode output tube controlling its servomotor means and a double triode control signal summing tube having one plate element connected to one control grid of the output tube and the other plate element connected to the remaining grid element of the output tube whereby for equal signals on both grids of the summing tube balanced output currents are obtained through the output tube; a source of control signal connected to a first grid element of one summing tube and to the second grid of the other summing tube, whereby the servomotor means are operated in opposite directions; and means responsive to change in roll attitude of the craft operating said source of control signals.

19. Apparatus for selectively controlling the attitude of the craft from an attitude responsive device and selectively permitting manual control of the craft attitude, said apparatus comprising: attitude responsive means for supplying a voltage component in accordance with the variation of attitude of the craft, signal responsive means for supplying a voltage component varying according to an input signal thereto said signal responsive means comprising an A.C. motor having applied thereto D.C. currents through a circuit including resistors to control the speed of said motor; servo means coupled to said attitude responsive means and to said signal responsive means for varying the attitude of said craft in accordance with relative variations of said voltage components, means connected to said selective means for producing on the input circuit of said signal responsive means a signal for producing a change of attitude, and means for disabling said signal responsive means from attitude control of said craft and for varying said voltage component in accordance with said attitude responsive voltage component; and further means for reducing the D.C. current in said signal responsive means motor to increase the speed of said motor during noncontrol of the craft attitude from the signal responsive means.

20. In an automatic pilot for an aircraft having attitude changing means and motor means for positioning said attitude changing means, in combination: attitude responsive means for developing a signal, means for developing a signal from displacement of said motor means; a summing amplifier; means for controlling said summing amplifier from said two signals; means connected to the amplifier and developing a voltage drop due to conduction of said amplifier due to a difference in magnitude of said signals; relay means including a time delay means responsive to said drop in voltage; and further means responsive to said relay means when the duration of the voltage drop exceeds the period of time delay means for rendering said motor means ineffective to position said attitude changing means.

21. Control apparatus for an aircraft having elevon control surfaces operable in the same or in opposite directions for controlling craft pitch and bank attitudes with means for operating said elevons in the same or opposite directions and having a rudder surface for coordinating banked turns and power means operable to move said rudder surface controlled by a pilot operated control means, in combination; a hydraulic actuator interconnecting said pilot operated means and said rudder power means, said hydraulic actuator being arranged to effect control of said rudder power means independent of said pilot operated control means; means responsive to displacement of said elevons surfaces to bank said craft for effecting operation of said hydraulic actuator and means operated by said hydraulic actuator including a feedback arrangement for proportioning the extent of actuator displacement to operation of said elevons surfaces whereby the craft may be placed in a coordinated turn.

22. The apparatus of claim 12, and a third servomotor operating a rudder surface, an amplifier having two control sections operating the third servomotor, signal means responsive to the differential position of said attitude control devices, air speed responsive means for modifying the output of said signal means so that a position or negative operation results at selected airspeeds.

23. In a control apparatus for an aircraft for operating a control surface thereof; first means responsive to change in a condition of said craft rebalancing servo means controlled by said means for effecting displacement of said surface; second means responsive to a second condition of said craft; synchronizing means for balancing said second means during control of the servo means from the first means; and selective means for additionally controlling said servo means from the second means; and means responsive to the selective means increasing the permissible displacement control of said surface from said servo means by varying a feedback arrangement of said servo means.

24. Monitoring means for an automatic pilot for an aircraft having control surfaces, comprising: a first and a second balanceable network; a first and a second control surface operating means each including a servomotor the first and second operating means being respectively controlled by the first and second networks; a displacement feedback to each network from its servomotor; further means capable of an operable or unoperable position and effective in operable position for effecting operation of each of the surfaces of the aircraft by one of the networks through the related operating means for each surface; and means responsive to both feedback and effective on a difference in displacements of said servomotors for placing said further means in unoperable position to prevent such operation of the surfaces upon occurrence of such difference.

25. Monitoring means for an attitude damper for an aircraft about a horizontal axis thereof said damper operating a pair of control surfaces of the craft for opposing changes in craft position, said means comprising: a first and a second balanceable network; attitude rate responsive means unbalancing both networks; a first and a second operating means in said dampers for each surface and respectively controlled by the first and second networks; further means capable of an operable and unoperable position and effective in operable position for effecting operation of the surfaces of the craft by each operating means; and means responsive to a difference in displacement of the two said operating means for placing said further means in unoperable position to prevent further operation of either surface.

26. Monitoring means for control apparatus for an aircraft having a pair of attitude changing control surfaces, comprising: an attitude rate sensing device; an operating means for each surface both operating means controlled by said attitude rate device; means modifying the control of each operating means by said sensing device; and means responsive to both operating means when operating said surfaces in the same direction and effective when one surface has a greater control moment than the other thereby causing undesired craft rotation about a second axis, to prevent further operation of at least one surface by its operating means.

27. In condition control apparatus for a system having a condition changing device and motor means operating said device to change the condition, in combination: condition responsive means developing a first signal in accordance with the change in the condition; means developing a second signal opposing said first signal; an amplifier having a signal receiving section and an output section controlling said motor means; means combining said signals and applying them to the input section for controlling said amplifier; further means solely responsive to the second signal to the input section of said amplifier; and monitoring means responsive to said further means and effective only after a period of time normally required for the change in the condition to be corrected thereby to null said second signal, rendering said motor means ineffective to position said device.

28. In condition control apparatus for a system having a condition changing device and motor means operating said device to change the condition, in combination: condition responsive means developing a voltage signal in accordance with the change in said condition; a balanceable network operated by said signal; an amplifier, having a signal input section and an output section which are respectively, connected to said network connected for and controlling said motor means; and monitoring means connected to said input section and effective only after a period of time normally required to null said balanceable network, rendering said motor means ineffective on said device.

29. In an aircraft having operable means to alter craft attitude, control apparatus for said operable means comprising: a servomotor means displacing said operable means and a follow-up device; an amplifier controlling operation of said servomotor means; a craft flight condition sensing device; balanceable circuit means responsive jointly to said flight condition sensing device and displacement follow-up device of said servomotor means, operating said amplifier on unbalance of the circuit means; and monitoring means connected to the circuit means responsive simultaneously with said amplifier to said circuit means for rendering said servomotor means ineffective to control further said operable means upon a continued unbalance effect on said circuit means from said displaced servomotor means follow-up device.

30. In flight control apparatus for automatically controlling heading of an aircraft, in combination: first means responsive to bank tilt of the craft about its longitudinal axis and developing a voltage of single phase but of a magnitude in accordance with said tilt; an amplifier biased by said voltage; a heading means operated in accordance with the direction and extent of change in heading; and switch means responsive to said amplifier for preventing control of said apparatus by said heading means when the voltage on said amplifier exceeds a predetermined minimum magnitude.

31. In control apparatus for automatically controlling a condition changing device, in combination: an operable servo motor control system of the follow-up type controlling the device and having its operation dependent on the difference between the change in the condition and the position of said device; a control apparatus malfunction detector responsive to the position of said device; and time delay operated relay means operated by said malfunction detector and effective on duration of departure from a normal position of said device in excess of a predetermined time for disabling said servomotor from controlling said device.

32. In flight control apparatus for an aircraft having a flight condition changing device, in combination: means providing a first signal in accordance with change in the flight conditions; a servomotor controlled system providing a follow-up signal operating said device and dependent for operation thereof on the difference between first signal due to the change in the condition and the follow-up signal corresponding with the position of said device; a control apparatus malfunction detector also responsive to said follow-up signal, said malfunction detector comprising a time delay means having an output that lags its input receiving the follow-up signal and relay means controlled by said time delay means and effective on persistence of said follow-up signal in excess of a predetermined time for disabling said servomotor from controlling said device.

33. In an aircraft having a pair of attitude control devices simultaneously but separately operable in the same manner or direction to apply a control moment to change attitude of the craft about an axis thereof in the same direction, in combination: a first servomotor control system operating one device; a second servomotor control system operating a second device, a flight condition responsive device, a servomotor position device operated by each servomotor whereby each servomotor system is responsive to the position of its servomotor and the same flight condition of the craft; further means for rendering each servomotor system effective on its control device; a first monitoring means associated with said further means and responsive to a difference in the effect or control moments of each servomotor system and its device on said craft attitude for causing both servomotor systems to be ineffective on their respective control devices; and a second monitoring means associated with said further means and operative upon a continued displaced position from a normal position of a servomotor to render both servomotor systems ineffective on their respective control devices.

34. In an aircraft having a pair of control surfaces angularly displaceable to separately provide a control moment or effect, displacements of the same extent serving to jointly thereby normally change craft attitude about but one axis thereof, in combination: means responsive to a flight condition related to craft control about said axis; a first servomotor means operating one surface; a second servomotor means operating said other surface; a follow-up means driven by each servomotor; an amplifier controlling the first servomotor means; a second amplifier controlling the second servomotor means, both amplifiers being controlled by said first means and thus responsive to the same flight condition but each amplifier additionally responsive to the follow-up means which effect a control in accordance with the position of its servomotor; further means for rendering each servomotor means effective on its surface; first monitoring means associated with said further means and responsive to a difference in the effect or control moment of each servomotor means and surface on said craft attitude due to difference in magnitude of displacement of said servomotor means for causing both servomotor means to be ineffective on the surfaces; and second monitoring means associated with said further means and operative upon continued displacement of a servomotor means from a normal position to render both servomotor means ineffective on the surfaces.

References Cited in the file of this patent

UNITED STATES PATENTS

| | | |
|---|---|---|
| 1,882,730 | Avery | May 22, 1927 |
| 2,403,577 | Breitwieser | July 9, 1946 |
| 2,487,793 | Esval et al. | Dec. 18, 1946 |
| 2,751,169 | Kutzler | June 19, 1956 |
| 2,823,877 | Hess | Feb. 18, 1958 |
| 2,859,005 | Owen et al. | Nov. 4, 1958 |